US007440116B2

(12) United States Patent
Bankhead et al.

(10) Patent No.: US 7,440,116 B2
(45) Date of Patent: ***Oct. 21, 2008

(54) SURFACE PROFILING APPARATUS WITH REFERENCE CALIBRATOR AND METHOD OF CALIBRATING SAME

(75) Inventors: Andrew Douglas Bankhead, Leicester (GB); Ian Mark Lee-Bennett, Leicester (GB); Joseph Armstrong, Dunstable (GB)

(73) Assignee: Taylor Hobson Limited, Leicester (GB)

( * ) Notice: Subject to any disclaimer, the term of this patent is extended or adjusted under 35 U.S.C. 154(b) by 303 days.

This patent is subject to a terminal disclaimer.

(21) Appl. No.: 10/558,006

(22) PCT Filed: May 20, 2004

(86) PCT No.: PCT/GB2004/002159

§ 371 (c)(1),
(2), (4) Date: Nov. 22, 2005

(87) PCT Pub. No.: WO2004/104517

PCT Pub. Date: Dec. 2, 2004

(65) Prior Publication Data

US 2006/0285122 A1      Dec. 21, 2006

(30) Foreign Application Priority Data

May 23, 2003   (GB)   ................... 0311976.5

(51) Int. Cl.
*G01B 9/02*     (2006.01)
*G01B 11/02*    (2006.01)
(52) U.S. Cl. ...................... 356/515; 356/497
(58) Field of Classification Search ............. 356/479, 356/497, 489, 495, 511–515

See application file for complete search history.

(56) References Cited

U.S. PATENT DOCUMENTS 4,340,306 A * 7/1982 Balasubramanian ........ 356/513

(Continued)

FOREIGN PATENT DOCUMENTS

GB      2371856      *   8/2007

(Continued)

OTHER PUBLICATIONS

Byron S. Lee and Timothy C. Strand; *"Profilometry With A Coherence Scanning Microscope"; Applied Optics* vol. 29, No. 26; Sep. 10, 1990; pp. 3784 to 3788.

(Continued)

*Primary Examiner*—Patrick J Connolly
(74) *Attorney, Agent, or Firm*—RatnerPrestia

(57) ABSTRACT

A broad band surface profiling apparatus including a reference calibrator for calibrating the apparatus to compensate for surface features of the reference surface. A user is instructed to conduct calibration measurement operations using a calibration sample having a calibration surface to obtain calibration surface topography data for the calibration sample. At each calibration measurement operation, an image representing the calibration surface topography data is displayed to the user and the user has the option to accept or reject the calibration surface topography data represented by the displayed image. The reference calibrator has a surface topography data processor and a mean surface calculator for calculating mean surface topography data using the processed calibration surface topography data accepted by the user to provide reference surface features data. A reference surface features remover is provided for adjusting surface topography data obtained for a sample surface in accordance with the reference surface features data.

35 Claims, 16 Drawing Sheets

U.S. PATENT DOCUMENTS

| | | |
|---|---|---|
| 4,387,994 A | 6/1983 | Balasubramanian |
| 4,845,356 A | 7/1989 | Baker |
| 5,706,085 A | 1/1998 | Blossey et al. |
| 5,907,404 A | 5/1999 | Marron et al. |
| 6,031,928 A | 2/2000 | Scott |
| 6,191,862 B1 | 2/2001 | Swanson et al. |
| 6,215,555 B1 | 4/2001 | Chivers |
| 6,345,107 B1 | 2/2002 | Scott |
| 6,545,761 B1 | 4/2003 | Aziz et al. |
| 6,956,657 B2 | 10/2005 | Golini et al. |
| 7,106,454 B2 * | 9/2006 | De Groot et al. ............ 356/511 |
| 2003/0011784 A1 | 1/2003 | DeGroot et al. |

FOREIGN PATENT DOCUMENTS

| | | |
|---|---|---|
| WO | WO/2004/048886 | 6/2004 |
| WO | WO 03/078925 | 3/2006 |

OTHER PUBLICATIONS

UK Search Report Under Section 17 for Application No. GB 0311976.5; Claims Searched, 1-68; Dated Nov. 28, 2003.

PCT International Search Report for International Application No. PCT/GB2004/002159; Search Completed Aug. 24, 2004; Search Report Mailed Sep. 2, 2004.

* cited by examiner

90

93

SURFACE PROFILING APPARATUS WITH REFERENCE CALIBRATOR AND METHOD OF CALIBRATING SAME

This application is the U.S. national phase application of PCT International Application Ser. No. PCT/GB2004/002159, filed May 20, 2004, and claims priority of British Patent Application Ser. No. 0311976.5, filed May 23, 2003.

This invention relates to a surface profiling apparatus, in particular surface profiling apparatus for determining surface profile data using interferometric techniques.

As discussed in a paper entitled "Profilometry with a Coherence Scanning Microscope" by Byron S. Lee and Timothy C Strand published in Applied Optics Volume 29, No. 26 10 September 1990 at pages 3784 to 3788, as manufacturing tolerances have reduced, demands have increased on optical metrology techniques for improved lateral and vertical resolution. Conventional monochromatic interferometric surface profiling apparatus offers good vertical resolution in the nanometre to Angstrom range but phase ambiguity limits the measurement range to phase shifts of less than $2\pi$.

As discussed in the paper by Lee and Strand, these problems can be addressed by the use of coherence scanning or broadband scanning interferometry which can provide practical measurement ranges easily exceeding hundreds of micrometres.

Coherence scanning or broadband scanning interferometry uses a standard interferometer such as a Michelson interferometer with a broadband spatially incoherent light source such as a quartz halogen lamp. Generally, but not necessarily, the broadband source will be a white light source. One of the sample surface whose profile is to be determined and the reference mirror of the interferometer is moved relative to the other along a scan path to change the relative path length and a two-dimensional image sensor such as a CCD camera is used to sense the resulting interference pattern which changes as the sample surface and reference mirror are moved relative to one another.

Each sensing element or pixel of the image sensor senses the portion of the interference pattern for a corresponding region or surface pixel of the sample surface and, as the sample surface and the reference mirror are moved relative to one another, the amount or intensity of light received by the sensing element will vary in accordance with the change in the interference fringes. The intensity of light received from a region of the sample surface will increase or decrease in amplitude in dependence upon the path length difference between the light paths from the reference mirror and the sensing surface and will have a coherence peak or extremum (maximum or minimum amplitude) at the position of zero path difference. Where different regions of the surface have different relative heights, then those different regions will have coherence peaks at different positions along the scan path. Accordingly, the relative positions of the coherence peaks can be used to provide surface profile data, that is data representing the relative height of the different regions of the sample surface.

The reference mirror may have significant form, that is the reference mirror may not be optically flat and may have other surface features such as surface roughness or texture, for example the reference mirror may have marks and even scratches. It is therefore desirable to calibrate the surface profiling apparatus to compensate for these surface features of the reference mirror. Moreover, due to environmental changes and the like, changes in the reference mirror surface features may occur over time. Although these changes will be very small, the nature of the measurements being made is such that they will have a significant effect on the measurement results. These changes mean that calibration of the surface profiling apparatus during manufacture is not sufficient and that it will be necessary from time to time for the user of the apparatus to calibrate the apparatus to compensate for the surface features of the reference mirror.

In one aspect, the present invention provides surface profiling apparatus having reference calibration means that facilitate calibration of the reference by a user.

In one aspect, the present invention provides surface profiling apparatus having reference calibration means that enable a user to accept or reject reference topography data acquired during the calibration procedures that so that the user can discard unsuitable reference topography data.

In one aspect, the present invention provides surface profiling apparatus having reference calibration means that enables the user to see the effect of addition of successive reference images enabling the user to decide how many reference images are required to enable satisfactory calibration to compensate for surface features of the reference mirror (that is features of form, surface roughness or texture, including any marks scratches or the like), so enabling the user to minimise the time required for calibration.

Embodiments of the present invention will now be described, by way of example, with reference to the accompanying drawings, in which.

Figure 1:
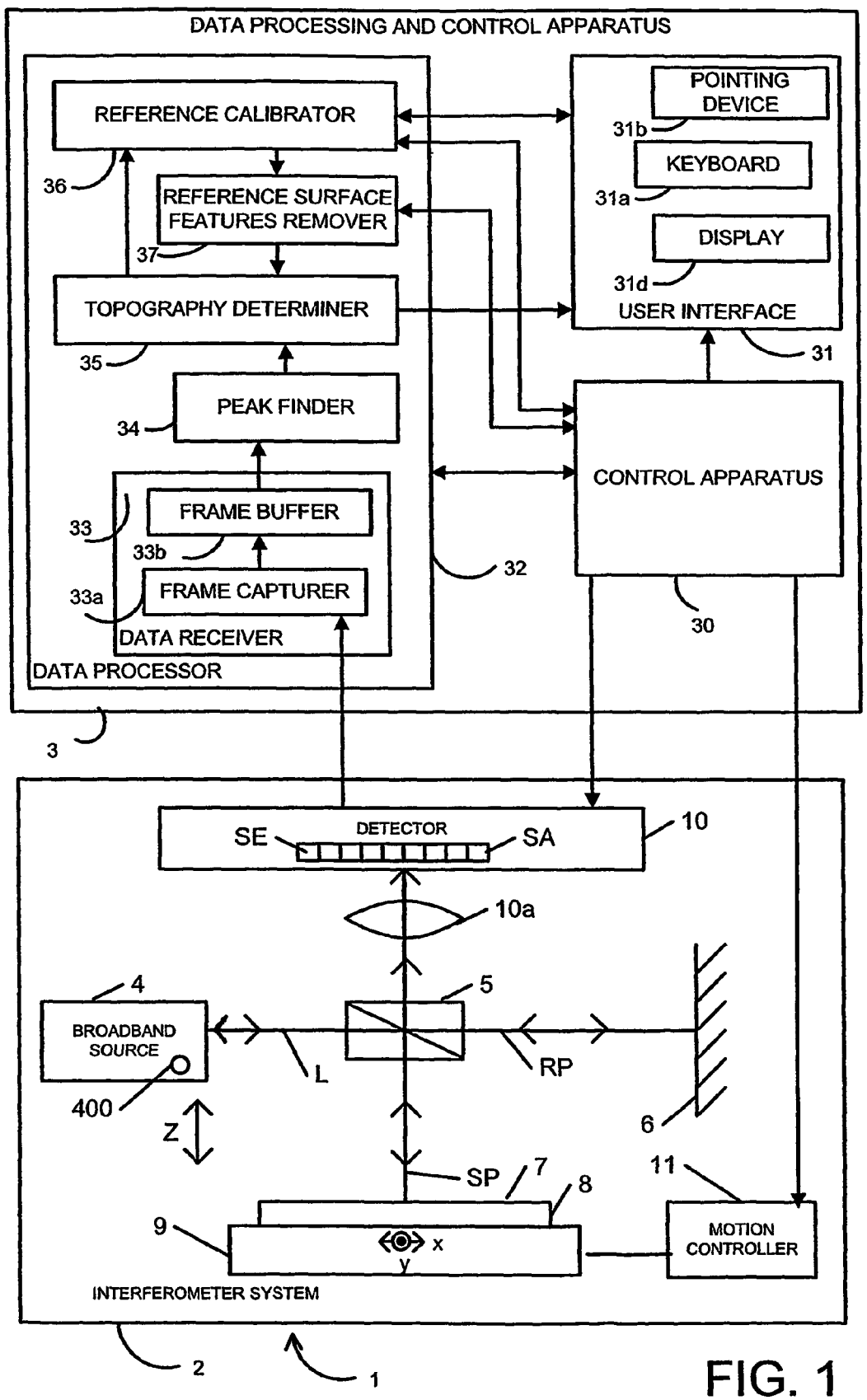
FIG. 1 shows a schematic block diagram of a surface profiling apparatus using a coherence scanning or broadband scanning interferometer having a reference calibrator.

Referring now the drawings, FIG. 1 shows a simplified schematic block diagram of a surface profiling apparatus 1 which has a broadband or coherence scanning interferometer system 2 and data processing and control apparatus 3.

The broadband scanning interferometer system 2 is based on a conventional interferometer but, as discussed in the introduction, instead of having a monochromatic spatially coherent light source, the broadband scanning interferometer system 2 has a broadband source 4 which may be, for example, a white light source such as a quartz halogen lamp coupled to a regulated DC power supply having a light intensity output user control 400 provided in the form of a user-rotatable knob.

The broadband source 4 provides broadband light L which is split by a beam splitter (illustrated in FIG. 1 as a single beam splitting prism) 5 into a first light beam which is directed along a reference path RP towards a reference mirror 6 and a second light beam which is directed along a sample path SP towards a surface 7 of a sample 8 mounted on a sample support stage 9. Light reflected from the reference mirror 6 returns along the reference path RP to the beam splitter 5 where it interferes with light reflected from the sample surface 7 back along the sample path SP. A focussing element 10a is provided to focus an image of the region of interference onto a detector 10.

Typically, the interferometer has, for example, a Mirau, Michelson or Linnik configuration.

In this embodiment, the detector 10 has, as shown very diagrammatically in FIG. 1, a 2D (two-dimensional) array SA of image sensing elements SE. The array SA images an area of the sample surface 7 falling within the field of view of the detector 10. Each individual sensing element of the 2D sensing array of the detector 10 detects the portion of the interference pattern falling within the acceptance cone of that element and resulting from a corresponding surface region or pixel of the area of the sample surface 7 so that, effectively, the imaged area of the surface can be considered as a 2D array of surface regions or pixels. In this example, the detector 10 is a CCD (Charge Coupled Device) digital camera, for example, a Vosskühler GmbH: CCD 1300 CCD digital camera.

A motion controller 11 is provided to effect relative movement between the sample surface 7 and the reference mirror 6 so as to change the difference in the lengths of the paths travelled by light reflected from the reference mirror 6 and light reflected from the sample surface 7. As shown in FIG. 1, the motion controller 11 is arranged to move the reference mirror 6 along the reference path RP. This is equivalent to moving the sample surface 7 along a scan path in the Z direction shown in FIG. 1.

The detector 10 is arranged to capture or sense the light intensity (ie the interference pattern) at intervals as the reference mirror 6 is moved. In this example, the detector captures or senses the light intensity at intervals corresponding to movement of the reference mirror 6 by 75 nm. 2D image or frame data representing the intensity pattern for the field of view of the detector 10 is acquired by the detector 10 at each interval.

The intensity of the illumination sensed by one sensing element SE of the 2D sensing array (that is the portion of the interference pattern provided by light reflected from the corresponding region or surface pixel of the sample surface 7 imaged on that sensing element SE) varies as the path length difference changes with movement of the reference mirror 6, resulting in a series of fringes which have a coherence peak at the position along the scan path corresponding to zero path length difference.

Figure 2:
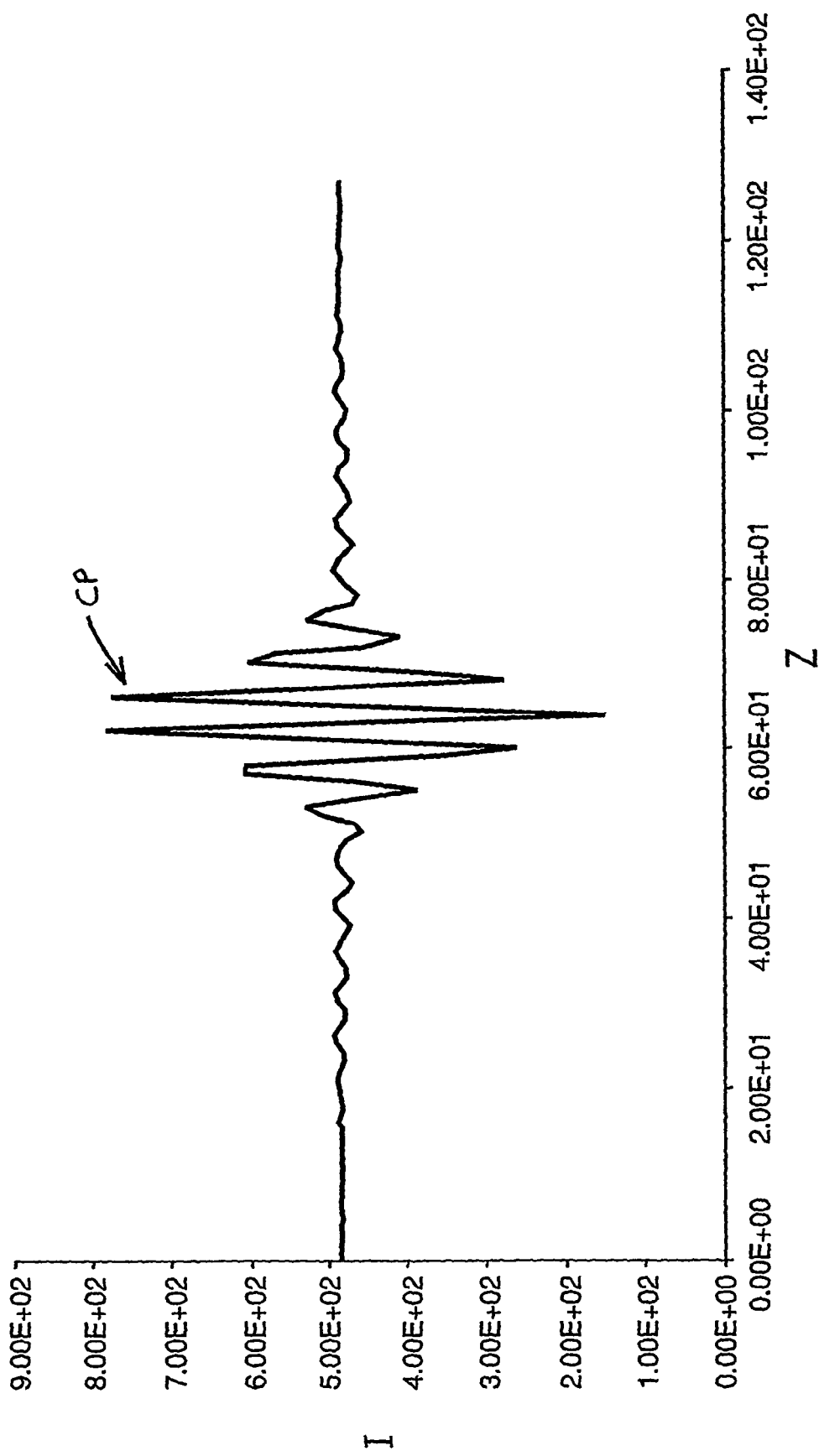
FIG. 2 shows a graph of intensity against position Z to illustrate the interference fringes for a sample surface region around a coherence peak or interference region.

FIG. 2 shows a graph of light intensity against position Z illustrating the change in intensity of the light sensed by a sensing element SE of the 2D sensing array of the detector 10 (and thus the interference fringe region) as the relative positions of the reference mirror 6 and sample surface 7 change and showing a coherence peak. The envelope of the intensity distribution is the Fourier transform of the spectral distribution of spatial frequencies in the broadband source.

As is well known in the art of surface metrology, although the surface 7 may be nominally flat, the surface may have some surface form and surface roughness so that different regions or surface pixels of the surface have different heights. The position or point along the scan path at which the coherence peak occurs will be different for surface pixels at different heights. Accordingly, the surface profile or topography of an area of a surface imaged by the detector 10 can be determined by conducting a measurement operation during which the motion controller 11 causes effective movement along the scan path and images are captured at intervals by the detector 10, and by then analysing the results to determine the coherence peaks for each surface region or pixel imaged by the detector 10. Generally, to provide sufficient data for analysis, the scan path will extend beyond the actual measurement path, that is the scan path includes run up and run down regions for which data is acquired for use in the analysis of the data for the actual measurement path.

As shown in FIG. 1, the data processing and control apparatus 3 has control apparatus 30 for controlling operation of the interferometer system 2, a data processor 32 for processing data received from the interferometer system 2 under the control of the control apparatus 30 and a user interface 31 for enabling a user or operator to control operation of the control apparatus (and thus of the surface profiling apparatus) and for enabling the user or operator to be provided with a data output representing the results of processing by the data processor 32 of the data acquired during a measurement operation and also for enabling messages such as error messages to be communicated to the user. The user interface generally comprises at least a keyboard 31a and a pointing device 31b, such as a mouse, and a display 31d.

The data processor 32 has a data receiver 33 comprising a frame capturer 33a and a frame buffer 33b for receiving and storing successive frames of measurement data from the detector 10 as the reference mirror 6 is scanned along a scan path and a peak finder 34 for, each surface pixel in the surface area imaged by the detector 10, determining from the frames of measurement data acquired by the detector 10, the position along the scan path at which the coherence peak (or a related position having a predetermined relationship to the coherence peak, for example a position halfway down the coherence peak curve from the actual peak) occurs for that surface pixel. The peak finder 34 is thus arranged to determine, for each surface pixel of the image surface area, the frame in which the coherence peak (or related position) occurs for that surface pixel.

The peak data is provided by the peak finder 34 to a topography determiner 35 that determines from the peak data provided by the peak finder 34, the relative heights of the surface pixels of the image surface area and thus the surface topography of that surface area and provides the user with a representation of the surface topography via the user interface 31. In this example, the topography determiner 35 is arranged to cause the display 31d of the user interface to display a bit-map image representing the surface topography.

The data processor 32 also includes a reference calibrator 36 that is arranged, in accordance with instructions received from a user via the user interface 31, to conduct a reference calibration procedure to determine the surface features of the reference mirror 6 (that is features of surface form, surface roughness or texture, including any marks scratches or the like that the reference mirror 6 may have) so as to acquire reference surface features data.

A reference surface features remover 37 is arranged to subtract the reference surface features data from the surface topography data so as to compensate for the surface features of the reference mirror so that the surface topography provided to the user interface 31 is not affected by any surface features in the reference mirror 6.

Figure 3:
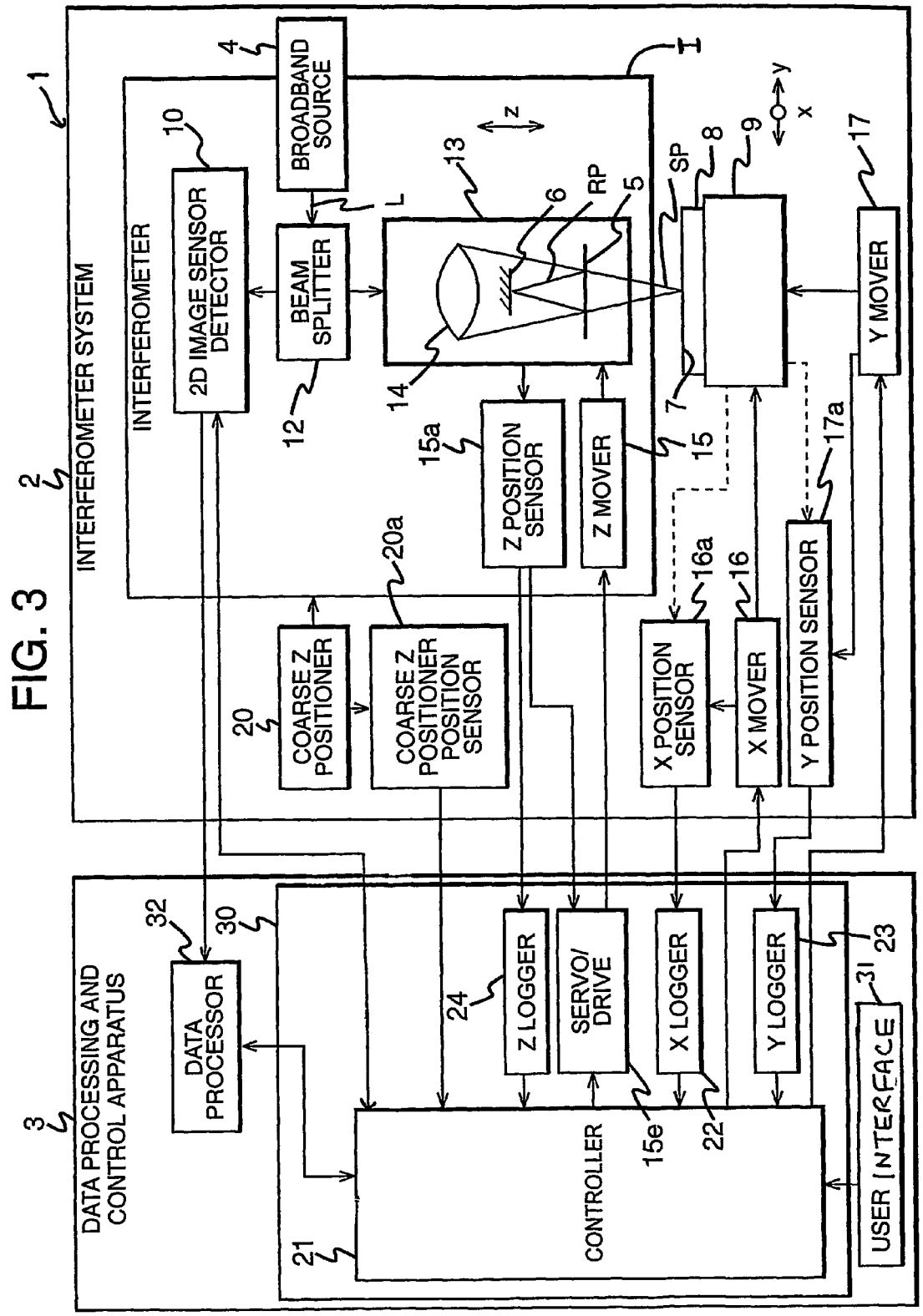
FIG. 3 shows a functional block diagram of surface profiling apparatus.
Figure 4:
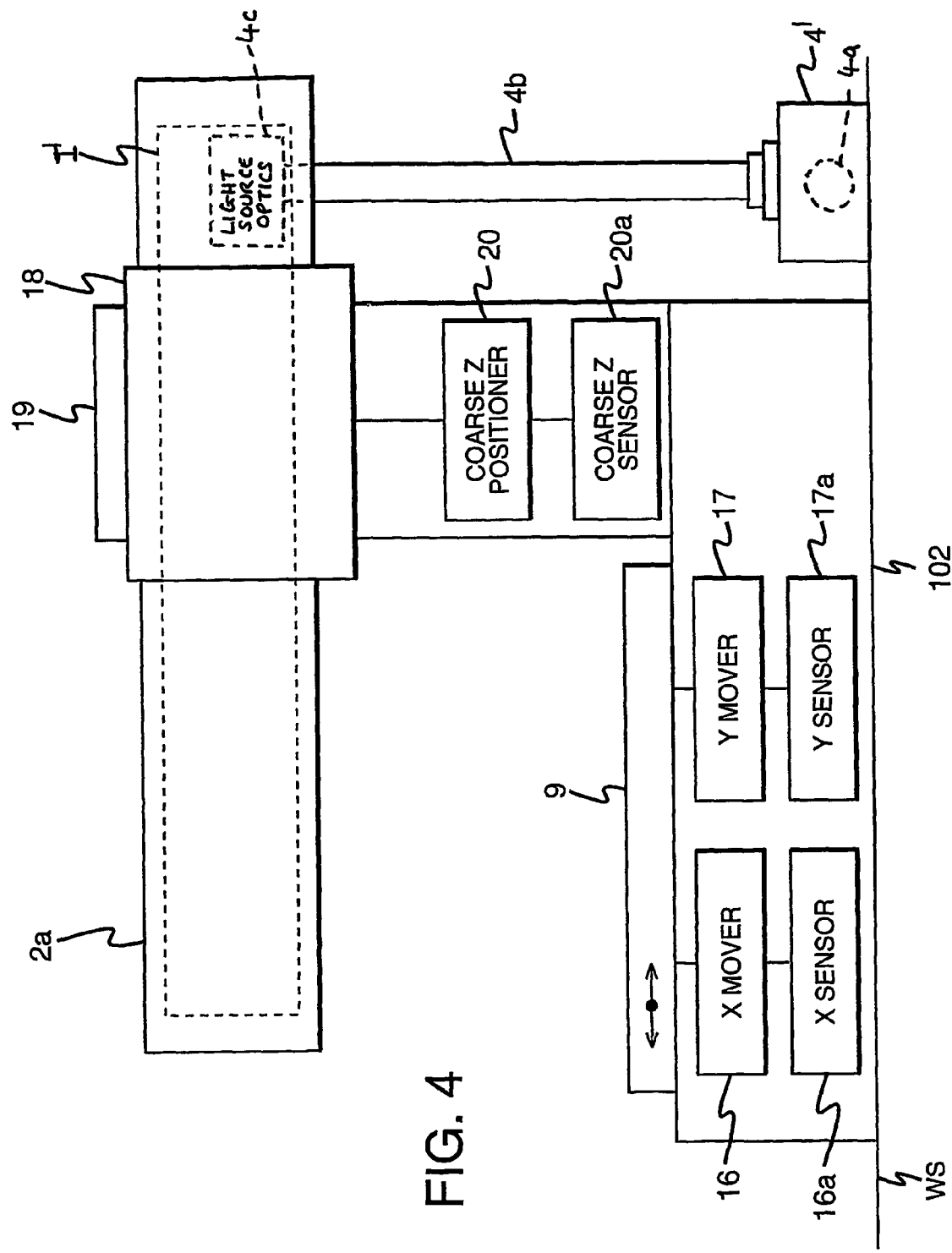
FIG. 4 shows a simplified side-elevational, part sectional view of the surface profiling apparatus shown in FIG. 3 but excluding the control apparatus.
Figure 5:
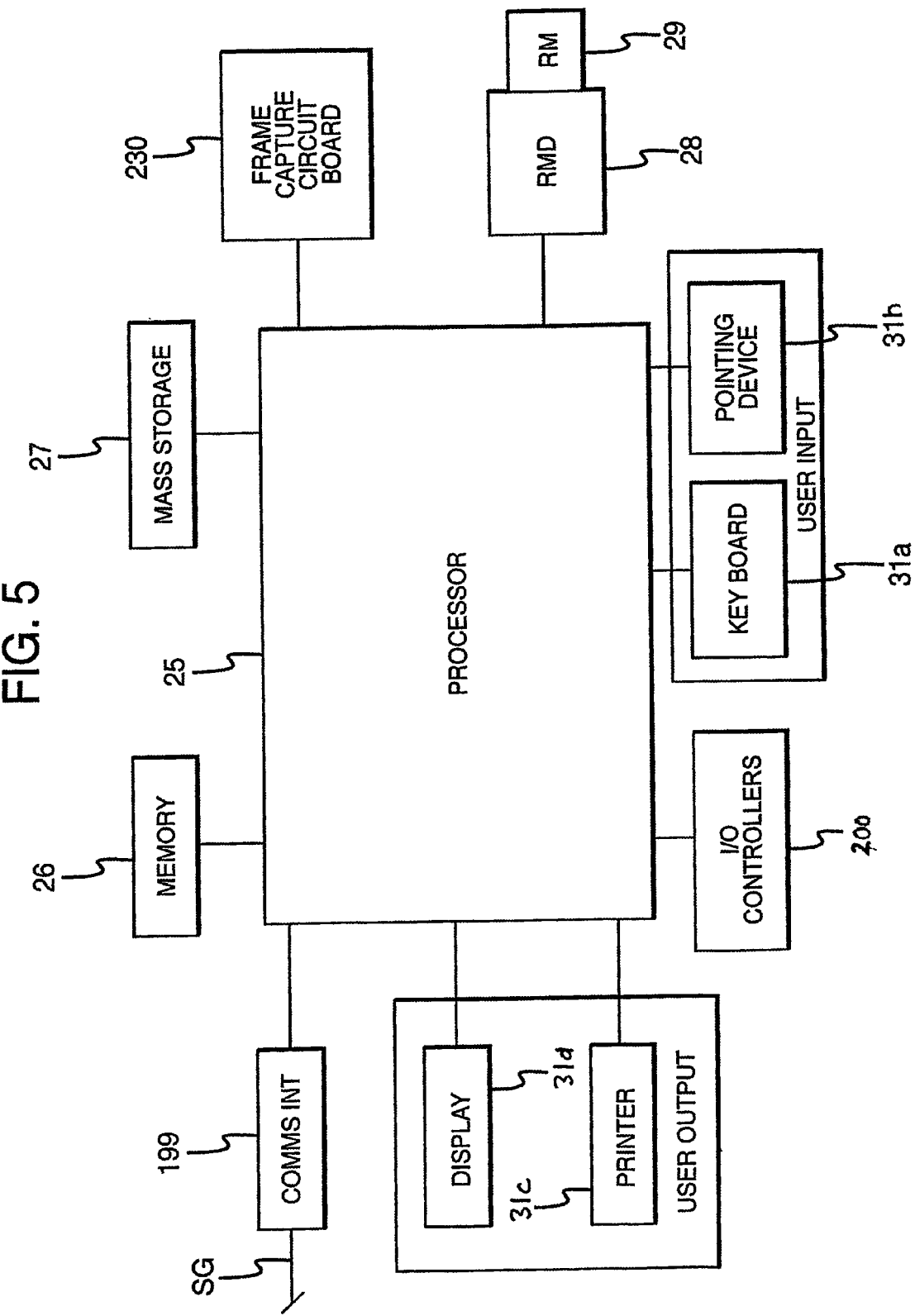
FIG. 5 shows a functional block diagram of computing apparatus that may be programmed to provide the control apparatus shown in FIG. 3.

One example of a surface profiling apparatus in which the interferometer has a Mirau configuration will now be described with reference to FIGS. 3 to 5 in which FIG. 3 shows an overall functional block diagram of the surface profiling apparatus, FIG. 4 shows a simplified side elevational view of the apparatus and FIG. 5 shows a block diagram of computing apparatus suitable for providing the data processing and control apparatus 3.

Referring to FIGS. 3 and 4, an interferometer I of the broadband scanning interferometer system 2 has a broadband source 4, typically comprising a quartz halogen lamp 4a coupled by an optical fibre cable 4b to light source optics 4c which generally comprises, in series, a diffuser, a changeable filter, an aperture stop, a lens, a field stop and a collimating lens that provides an emergent light beam L. The filter may be a neutral density filter or a band pass filter, designed to restrict the wavelength range of the light emitted by the broadband source 4, such as a Helium-Neon laser line filter designed to pass light having a Helium-Neon laser line wavelength.

Broadband light L is directed via abeam splitter 12 to an objective lens assembly 13 which includes, in addition to an objective lens 14, the beam splitter 5 and the reference mirror 6.

The beam splitter 5 splits the light beam provided by the beam splitter 12 into a first reference beam that is directed along the reference path RP and a second sample beam that is directed along the sample path SP from the interferometer I towards the surface 7 of the sample 8 mounted on the sample support stage 9.

The objective lens assembly 13, and thus the reference mirror 6, is movable in the Z direction by a Z direction mover 15, in this example a piezoelectric mover, under the control of servo/drive circuitry 15e of the control apparatus 30. The sample support stage 9 is movable in X and Y directions by an X mover 16 and a Y mover 17, respectively, to enable different areas of the sample surface 7 to be brought within the field of view of the detector 10. Although not shown in FIG. 4, the sample support stage may be arranged on a tilting system that enables the surface of the sample support to be tilted about the Z axis.

As shown schematically in FIGS. 3 and 4, the majority I' of the components of the interferometer I of the broadband scanning interferometer system 2 (apart from components of the light source prior to and including the optical fibre cable 4b) are mounted within a housing 2a mounted via a carriage 18 to a Z axis datum column 19.

The optical fibre cable 4b allows the remainder of the components of the broadband source to be provided in a separate light source assembly 4' which, as shown in FIG. 4, can be mounted on a work surface WS adjacent to the remainder of the apparatus so that the heat generating light bulb 4a is remote from the interferometer.

The fact that the components of the light source prior to and including the optical fibre cable 4b are outside the housing 2a is illustrated in FIG. 3 by showing the broadband source projecting from the housing 2a.

The carriage 18 is coupled via a drive mechanism (not shown) such as a ball screw or lead screw drive mechanism to a coarse Z positioner 20 in the form of a manually operable control or, in this example, a DC motor that enables the carriage 18 and, thus the interferometer I, to be moved up and down the column 19 in the Z direction to enable the interferometer to be moved to different scanning start positions.

As shown in FIG. 4, the sample support stage 9 is mounted on a support 102 that houses the X and Y movers 16 and 17 and supports the sample support stage 9. The X and Y movers 16 and 17 comprise in this example DC motors coupled to the sample support stage 9 by appropriate conventional drive mechanisms such as rack and pinion or ball screw drive mechanisms (not shown).

As shown in FIGS. 3 and 4, each of the Z, X and Y movers is associated with a corresponding position sensor 15a, 16a and 17a while the coarse Z positioner 20 may be associated with a coarse Z positioner position sensor 20a.

The control apparatus 30 has a controller 21 that controls overall operation of the interferometer system 2 and communicates with the user interface 31, data processor 32, and other parts of the control apparatus 30 which, in this example, consist of the servo drive circuitry 15e and X, Y and Z loggers 22, 23 and 24. The controller 21 is also arranged to control the servo/drive circuitry to cause the Z mover 15 to move the objective lens assembly by a distance corresponding to a scan step after each exposure of the 2D image sensor detector 10 so as to capture images at the required intervals. The controller 21 also receives an output from the coarse Z positioner position sensor 20a, if provided.

In the case of the X or Y mover 16 or 17, where the mover is a motor, then the corresponding position sensor may be a linear grating encoder. The dashed lines between the support stage 9 and the X and Y position sensors 16a and 17a in FIG. 3 indicate that the position sensors may sense movement of the support stage 9 directly rather than by signals derived from the corresponding motor. Where the Z mover 15 is a piezoelectric mover, then the position sensor 15a may be, for example, an interferometric system, such as a grating system, or an LVDT that provides signals representing movement of the objective lens assembly 13 relative to the housing 2a of the interferometer. For example, the housing of the objective lens assembly 13 may carry a diffraction grating and a fringe detection interferometric system may be mounted within the housing 2a, providing a count of the fringes to the Z logger 24 as the objective lens assembly 13 moves relative to the housing 2a. As another possibility, a capacitive sensor may be used. As a further possibility a Michelson interferometer (with a corner cube attached to the housing 13) may be used.

The data processing and control apparatus 30 may be implemented by programming computing apparatus, for example a personal computer. FIG. 5 shows a simplified block diagram of such computing apparatus. As shown, the computing apparatus has: a processor 25 associated with memory 26 (ROM and/or RAM); a mass storage device 27 such as a hard disk drive; a removable medium drive (RMD) 28 for receiving a removable medium (RM) 29 such as a floppy disk, CDROM, DVD or the like; input and output (I/O) controllers 200 for interfacing with the components of the broadband scanning interferometer system to be controlled by the control apparatus (for example, the Z, X and Y movers 15 to 17, the coarse Z positioner 20 and the detector 10) to enable the processor 25 to control operation of these component; and the user interface 31 consisting, in this example, of user inputs comprising the keyboard 31a and the pointing device 31b, and user outputs consisting, in this example, of the display 31d such as a CRT or LCD display and a printer 31c. The computing apparatus may also include a communications interface (COMMS INT) 199 such as a modem or network card that enables the computing apparatus to communicate with other computing apparatus over a network such as a local area network (LAN), wide area network (WAN), an Intranet or the Internet. In this example, the data receiver 33 is provided as a dedicated frame capture circuit board 230 installed within the computing apparatus.

The processor 25 may be programmed to provide the data processing and control apparatus shown in FIG. 3 by any one or more of the following ways:
1. by pre-installing program instructions and any associated data in a non-volatile portion of the memory 26 or on the mass storage device 27;
2. by downloading program instructions and any associated data from a removable medium 29 received within the removable medium drive 28;
3. by downloading program instructions and any associated data as a signal SG supplied from another computing apparatus via the communications interface 199; and
4. by user input using the keyboard and, if appropriate, the pointing device.

The computing apparatus, when programmed by program instructions to provide the control apparatus 30, enables a measurement operation to be controlled in accordance with instructions received by a user, and the resulting frame data supplied by the detector 10 to be analysed to determine the surface profile or topography of the area of the surface imaged onto the 2D array of the detector 10.

Figure 6:
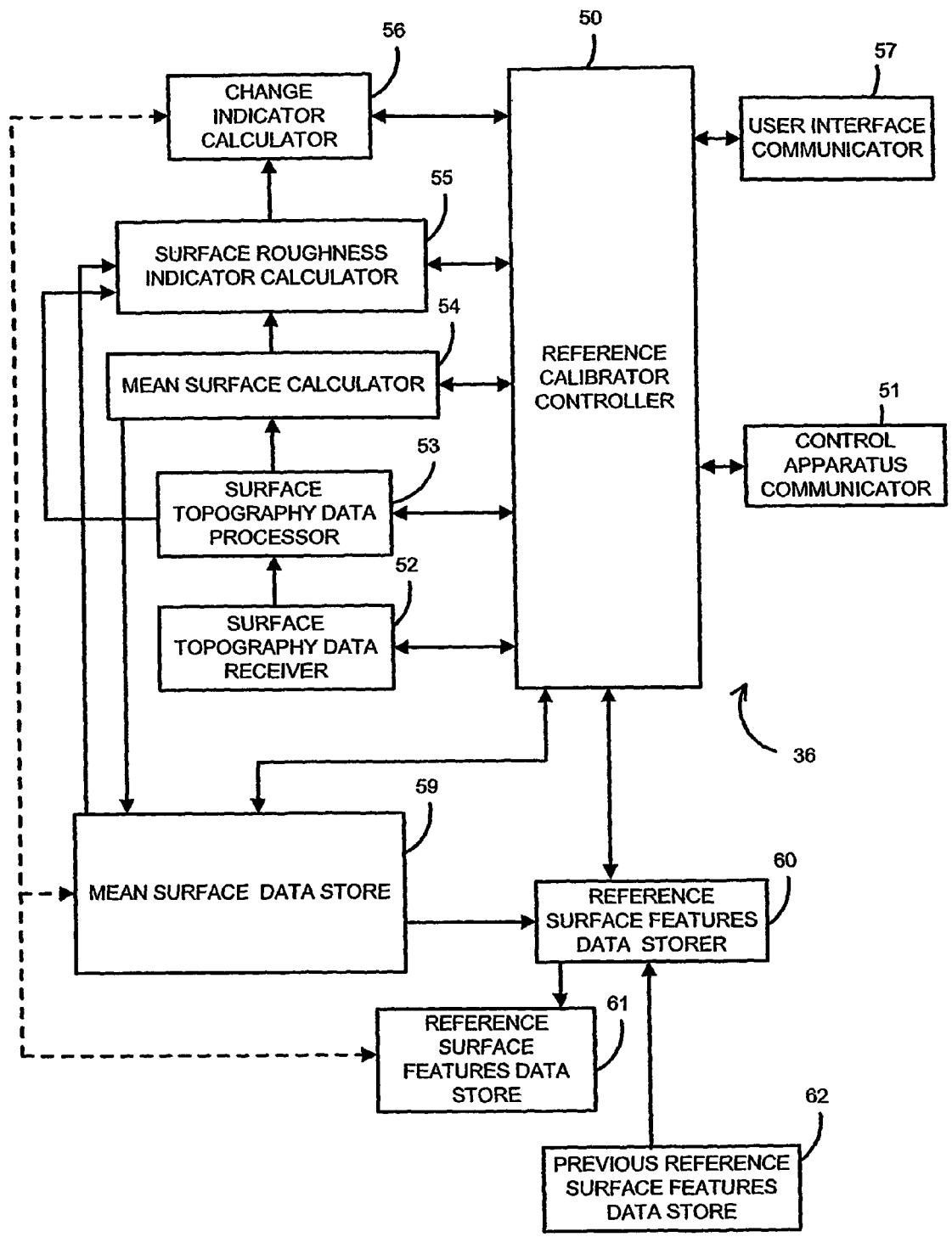
FIG. 6 shows a functional block diagram of the reference calibrator shown in FIG. 1.

FIG. 6 shows a block diagram illustrating the functional components of the reference calibrator 36.

The reference calibrator 36 comprises a reference calibrator controller 50 that controls overall operation of the reference calibrator 36, in particular controls communication with the user interface 31 via a user interface communicator 57 enabling command and data to be input to the reference calibrator 36 by the user and enabling the reference calibrator 36 to output data to the user, for example by displaying the data on the display 31.

The reference calibrator 36 also has a control apparatus communicator 51 for enabling communication between the control apparatus 30 and the reference calibrator 36.

In addition, the reference calibrator 36 has a surface topography data receiver 52 for receiving surface topography data from the topography determiner 35, a surface topography data processor 53 for carrying out a number of processing operations on the surface topography data and a mean surface calculator 54 for determining, for each surface pixel, a value representing a mean of a number of surface topography data values for that surface pixel determined as a result of a number of calibration measurement operations to be described below.

The mean surface calculator 54 is arranged to store mean surface data in a mean surface data store 59. A reference surface features data storer 60 is also provided and is arranged, under the control of the reference calibrator controller 50, to cause the mean surface data stored in the mean surface data store 59 at the end of a calibration procedure to be stored in a reference surface features data store 61, if the user indicates that the calibration is acceptable, or to retrieve previous reference surface features data from a previous reference surface features data store 62 and store that in the reference surface features data store 61, if the user indicates that the results of the calibration are not acceptable.

The reference calibrator 36 also includes, in this example, a surface roughness indicator calculator 55 for providing an indication of surface roughness to give the user an indication as to how close the current mean surface data is to removing the surface features of the reference mirror, that is an indication as to how well the calibration procedure is proceeding, and a change indicator calculator 56 for calculating a value representing a change or drift in the surface features of the reference mirror 6 since the last calibration to give the user an idea as to how frequently it may be necessary to recalibrate the surface profiling apparatus.

Operation of the surface profiling apparatus described above during a reference calibration will now be described with the help of FIGS. 7 to 9 which show flow charts illustrating steps carried out by the surface profiling apparatus during the reference calibration procedure, FIG. 10 which shows a reference calibration interface displayed to the user during the reference calibration procedure and FIGS. 11a to 11c which show examples of images displayed to the user by the user interface shown in FIG. 10.

Figure 7:
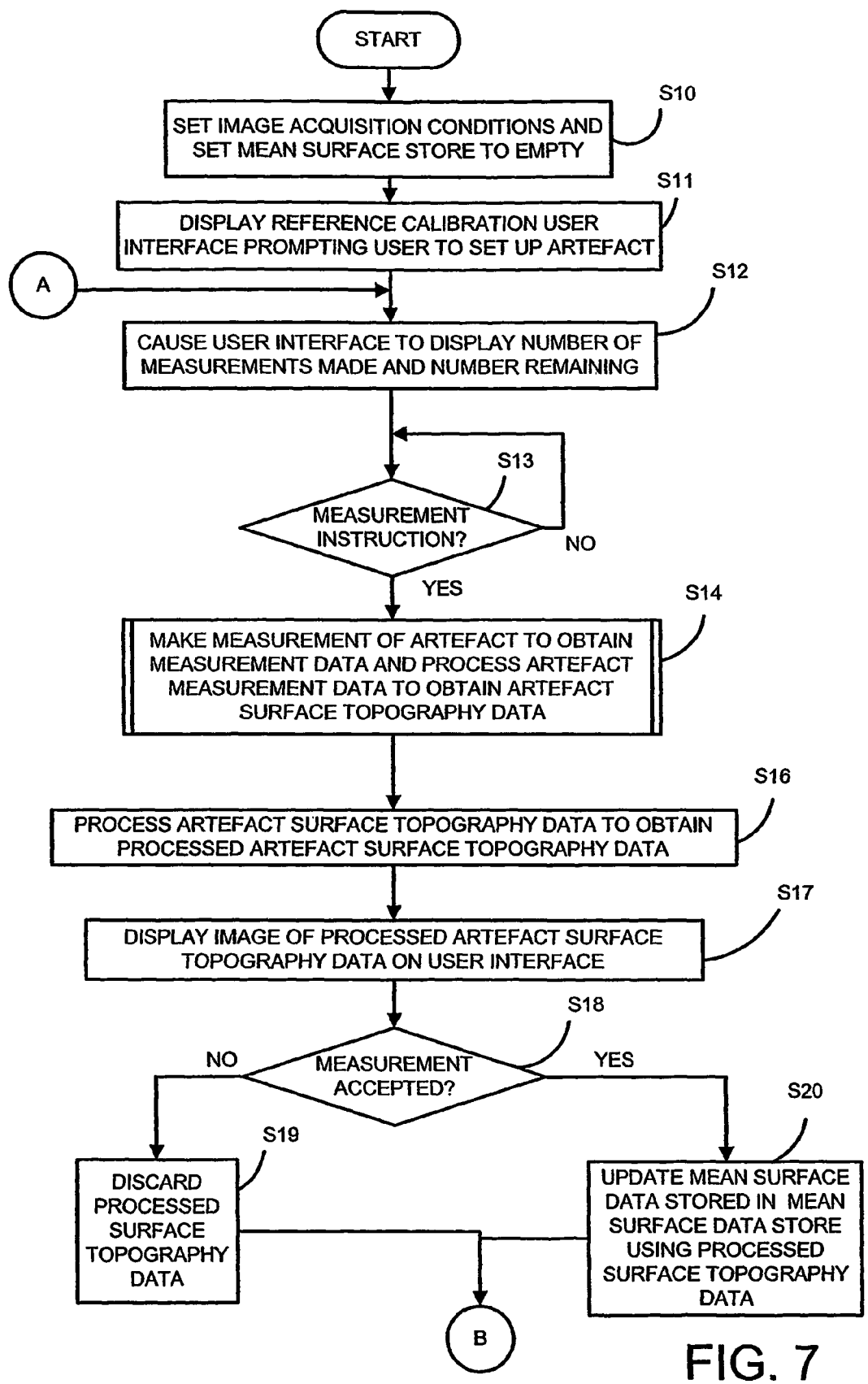
FIGS. 7 to 9 show flowcharts for illustrating operation of the surface profiling apparatus shown in FIG. 1 during a calibration procedure to obtain reference surface features removal data.

When the user selects a reference calibration procedure from, for example, a selection user interface (not shown) displayed by the control apparatus 30 on the display 31d of the user interface, then at step S10 in FIG. 7, the control apparatus 30 and the reference calibrator controller 50 communicate via the control apparatus communicator 51 to set the image acquisition conditions so that: the zoom is set at ×1 (that is, no zoom); the binning (the number of adjacent sensing elements SE outputs that are added together) is set to ×1, that is no binning; and the neutral density filter is selected. In addition, the reference calibrator controller 50 ensures that the mean surface data store 59 is empty.

The reference calibrator controller 50 then, at S11 in FIG. 7, causes, via the user interface communicator 57, the display 31d to display a reference calibration user interface screen.

Figure 10:
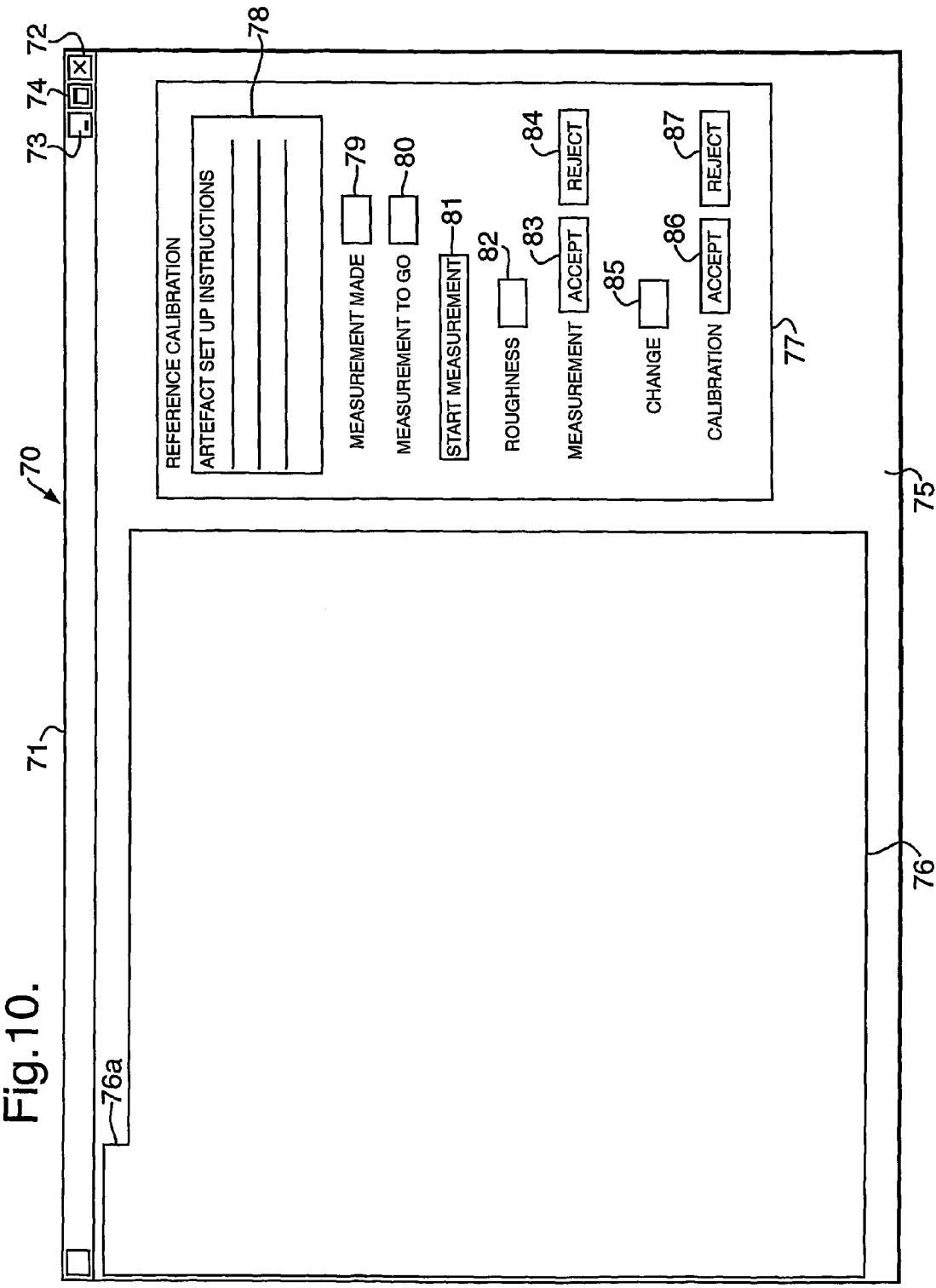
FIG. 10 shows, very schematically, one example of a reference calibration user interface that may be provided by the surface profiling apparatus to assist the user during the reference calibration procedure.

FIG. 10 shows an example of a reference calibration user interface screen 70. As shown in FIG. 10, the screen 70 has a Windows style appearance with a title bar 71 that, although not shown, displays data identifying the surface profiling apparatus, and the usual close and minimise buttons 72 and 73 (and optionally also a maximise button 74) in the top right hand corner. A working area 75 of the reference calibration user interface screen 70 displays an image window 76 within which images are displayed to the user and a reference calibration window 77.

The reference calibration window 77 has an instruction window 78 entitled "artefact set up instructions" that displays user instructions for setting up an artefact to be used for the calibration procedure. In the interests of simplicity, these instructions are illustrated simply by a number of parallel lines in FIG. 10.

In this example, the artefact set up instructions instruct the user to place an artefact in the form of a λ/50 circular coated glass mirror flat as the sample 8 on the sample support stage 9, then to level the artefact and to adjust the Z height of the interferometer I using the coarse Z positioner 20 to bring the image into focus so as to make the interference fringes visible.

The artefact set up instructions 78 also include information provided by the control apparatus 30 identifying the lens magnification currently being used by the objective lens assembly 13 of the surface profiling apparatus (for example ×10 or ×20) so that the user can calibrate the surface profiling apparatus for different lens magnifications.

Thus, at S11 in FIG. 7, the reference calibrator controller 50 causes, via the user interface communicator 57, the display 31d to display the reference calibration user interface screen 70 and prompts the user to set up the artefact, in this case a coated glass mirror flat.

Then, at S12, the reference calibrator controller 50 causes the current number of measurements made and the number of measurements remaining or still to go to be displayed in respective data display windows 79 and 80 of the reference calibration window 77. As this is the first measurement, then the reference calibrator controller 50 will cause, via the user interface communicator 57, the number "0" to be displayed in the window 79 and the total number of required measurements to be displayed in the window 80. In this example, the total number of required measurements for the reference calibration is preset as, for example, 8. However, as an option, the window 80 may be a drop down window that enables a user to change the number of measurements, for example to select from two alternatives such as 8 or 12.

The reference calibrator controller 50 then waits at S13 in FIG. 7 for the user to select a start measurement button 81 of the reference calibration window 77 using the pointing device 31b or keyboard 31a to instruct a calibration measurement operation to be carried out.

When the user selects the start measurement button 81, then this instruction is supplied via the user interface communicator 57 to the reference calibrator controller 50 which instructs the control apparatus 30 via the control apparatus communicator 51 to commence a calibration measurement operation at step S14 in FIG. 7.

When the control apparatus 30 receives an instruction to commence a calibration measurement operation, then the controller 21 instructs the 2D image sensor detector 10 to commence acquiring images. After each exposure by the 2D image sensor detector 10 to capture an image, the controller 21 requests the servo/drive circuitry to cause the Z mover 15 to move the objective lens assembly 13 (and thus the reference mirror 6) by a scan step with the scan step distance and the length of the scan path (that is the total number of scan steps) being predefined for the reference calibration.

Figure 9:
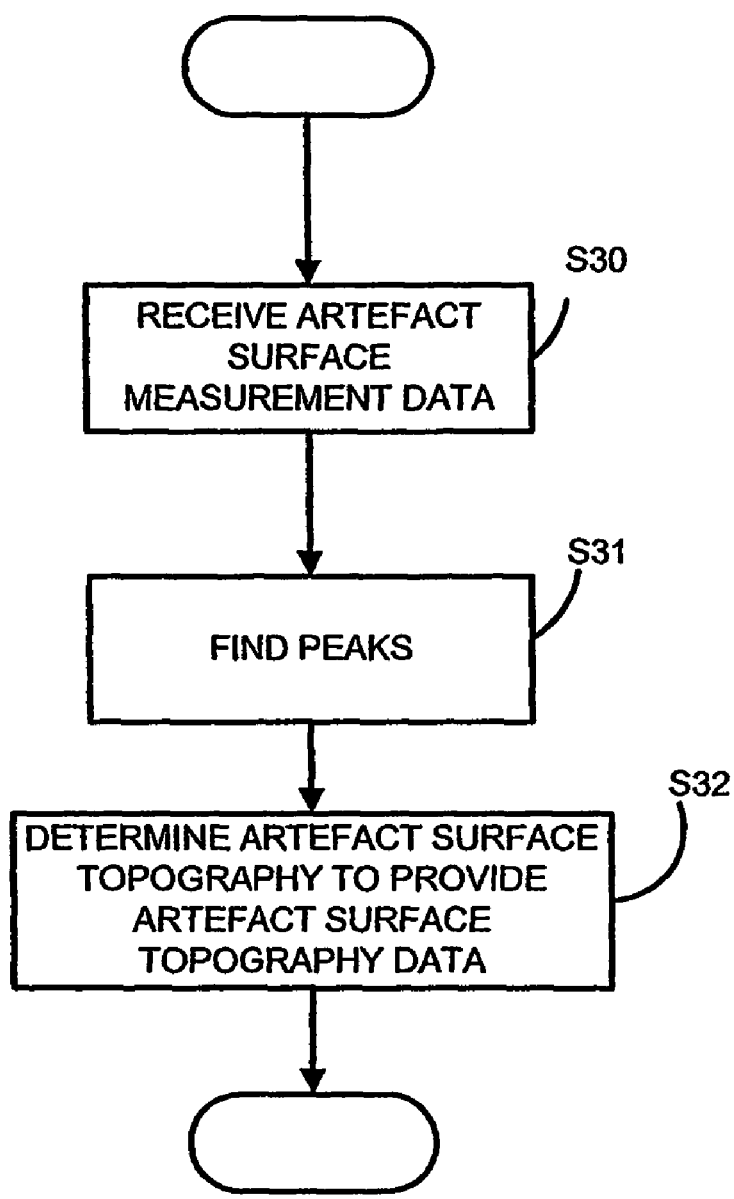

FIG. 9 shows a flow chart illustrating the steps carried out by the data processor 32 to provide the artefact surface topography data.

The detector 10 supplies images or frames of the interference pattern captured at the required intervals or scan steps along the scan path to the frame capturer 33a of the data receiver 33. The captured frames are stored in the frame buffer 33b of the data receiver 33 in association with data identifying the nominal Z position corresponding to that scan step (and thus that image) determined by the controller 21 from the signals logged by the Z logger 24 in accordance with the output of the Z position sensor 15a. The data receiver 33 thus receives, at step S30 in FIG. 9, for each scan step, frame data representing the intensity value sensed by each sensing element SE at that scan step.

The peak finder 34 then processes the frame data at step S31 in FIG. 9 to determine, for each surface pixel (which corresponds to a sensing element SE when the binning is ×1) of the artefact the frame and thus the scan step and Z position at which the intensity value represents the coherence peak (or a position related to the coherence peak) for that surface pixel.

Then, at step S32 FIG. 9, the surface topography determiner 35 determines from the peak data provided by the peak finder 34 the relative heights of the coherence peaks (or related positions) determined for each surface pixel to provide artefact surface topography data.

The peak finder 34 may identify the coherence peak (or position related to the coherence peak) and surface topography determiner 35 may determine the surface topography by, for example, using any of the techniques described in U.S. Pat. Nos. 4,340,306 and 4,387,994 or described in International Patent Application number GB03/001067 (WO03/078925), the whole contents of which are hereby incorporated by reference.

The surface topography data determined by the topography determiner 35 is supplied via the surface topography data receiver 52 to the surface topography data processor 53 which, under the control of the reference calibrator controller 50, processes the artefact surface topography data at S16 in FIG. 7 to effect, in order: levelling to compensate for surface tilt; thresholding to remove or modify excessive data values; where data for a surface pixel is missing, replacing or filling in the missing data with data obtained by interpolation from adjacent surface pixel data or a similar technique; and low pass filtering to remove high frequency components.

In this example, the levelling procedure is a zero mean levelling procedure that involves the fitting of a polynomial using a least squares fitting procedure to determine a constant representing the average surface height and x and y coefficients representing the average surface gradient or tilt and then subtracting the determined average surface height and the average surface gradient or tilt from the surface topography data while the thresholding procedure removes values over 5× the root mean square (RMS) value of the data or truncates any such values to 5× the RMS value.

Then, at S17 the reference calibrator controller 50 causes, via the user interface communicator 57, the display 31d to display in the image window 76 (FIG. 10) an image representing the processed artefact surface topography data.

Figure 11A:
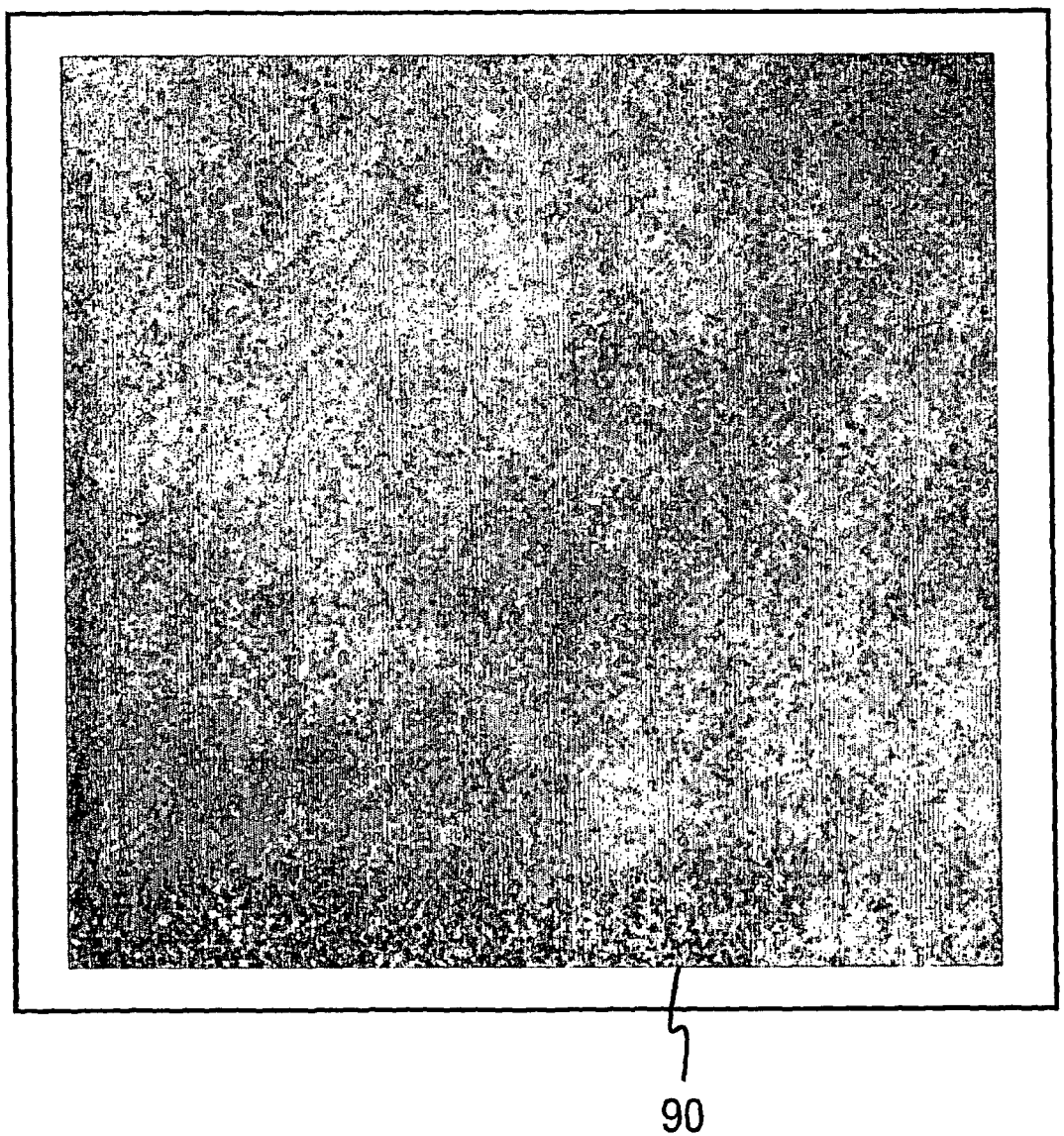
FIGS. 11a, 11b and 11c show examples of images that may be displayed to the user on the user interface during a reference calibration procedure.
Figure 11B:
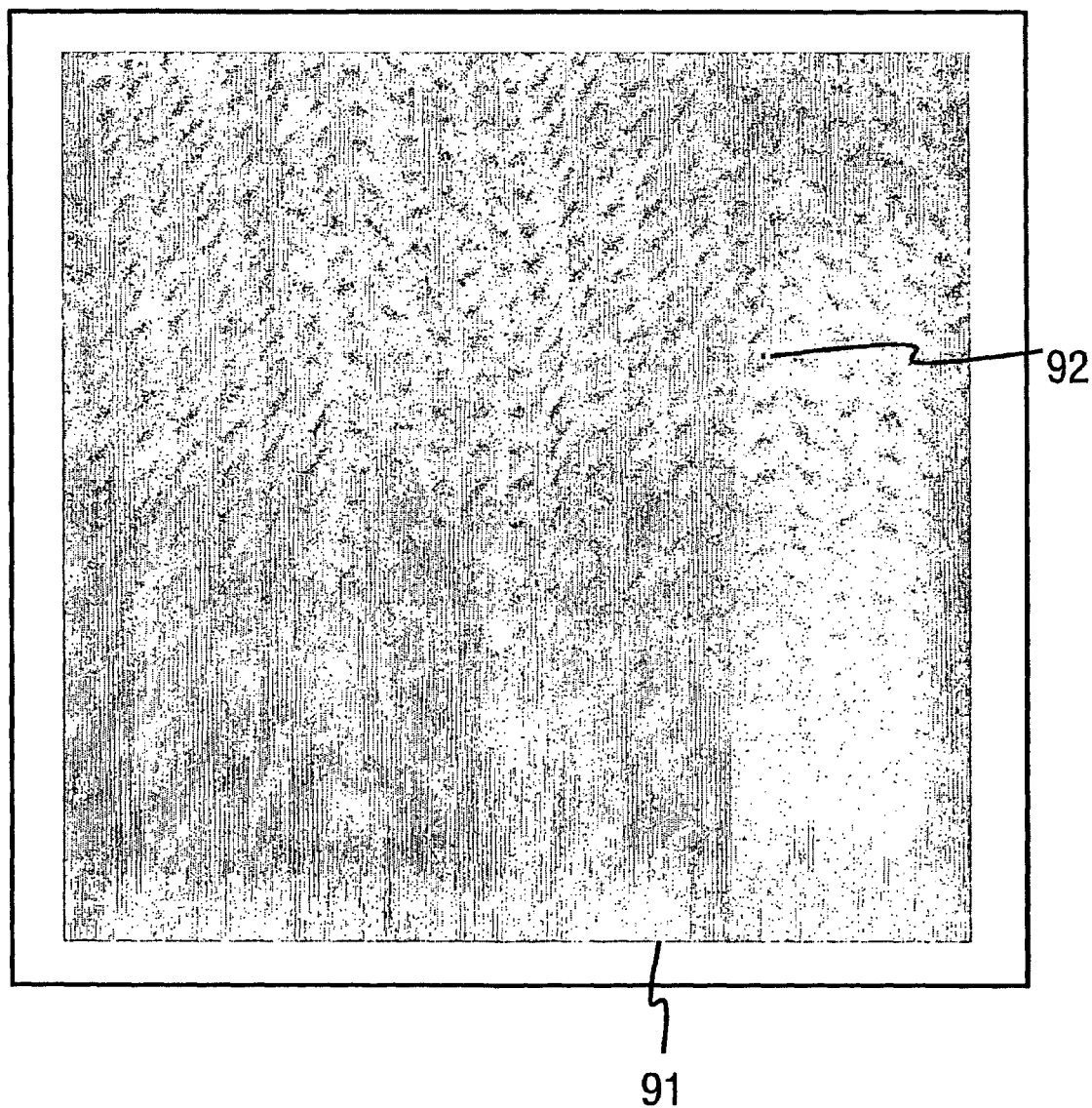
Figure 11C:
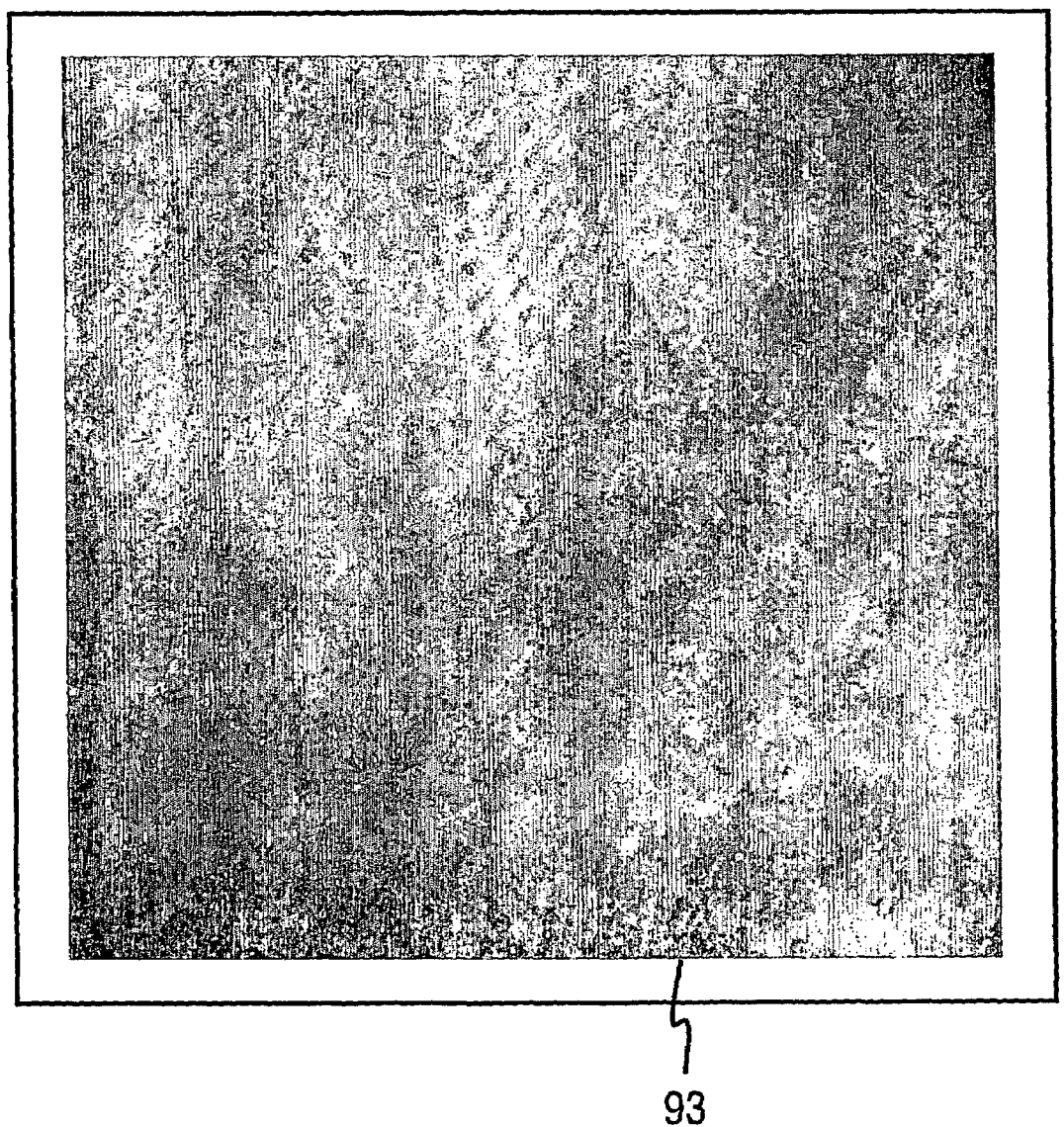

FIGS. 11a and 11b show images 90 and 91, respectively that may be displayed to the user at this stage. Display of the processed artefact surface topography data to the user enables the user to check the acquired image to see if it is satisfactory. In this case, the image 90 shown in FIG. 11a is generally satisfactory. However, a speck of dust 92 is clearly visible in the image shown in FIG. 11b indicating that the calibration measurement operation from which the image data was derived was unsatisfactory.

Once the user has inspected the displayed image, then the user can elect to accept the measurement by selecting an accept button 83 or to reject it selecting a reject button 84 of the reference calibration window 77 shown in FIG. 10. In the present case, if the image displayed is the image 90 shown in FIG. 11a then the user should select the accept button 83 whereas if the image displayed is the image shown in 11b then user should select the reject button 84.

The reference calibrator controller 50 waits at S18 in FIG. 7, for the user to select either the accept button 83 or the reject button 84.

If the user selects the reject button 84 because the image displayed indicates that the measurement is unsatisfactory (because of specks of dust and the like), then the reference calibrator controller 50 discards that processed surface topography data at S19.

If, however, the user selects the accept button 83 then, at S20 in FIG. 7, the reference calibrator controller 50 causes the mean surface calculator 54 to update the mean surface data stored in the mean surface data store 59 using a mean calculation method that retains amplitude as values are added.

In this example, the mean surface calculator 54 is arranged to calculate an amplitude-retaining mean by causing the processed surface topography data for the first calibration measurement operation to be copied to the mean surface data store 59 and then by, for each subsequent calibration measurement operation, updating the mean by, for the data representing a surface pixel, adding a proportion of the current processed surface topography data for that surface pixel to a proportion of the currently stored mean surface data value for that surface pixel where the two proportions add up to one, for example the mean surface calculator 54 may be arranged to add 1/n of the value for a surface pixel in the current processed surface topography data to (n−1)/n of the currently stored mean surface data value for that surface pixel where n is, for example, eight.

As another possibility, the mean surface calculator 54 may be arranged to calculate a fixed mean by, for each surface pixel, again copying the processed surface topography data for the first calibration measurement operation to the mean surface data store 59 but then adding ½ of the processed surface topography data for the for the second calibration measurement operation to ½ of the currently stored mean surface data, adding ⅓ of the current processed surface topography data for the third calibration measurement operation to ⅔ of the current mean surface data, adding ¼ of the current processed surface topography data for the fourth calibration measurement operation to ¾ of the currently stored mean surface data and so on until the nth calibration measurement operation. In this case the mean surface calculator 54 includes a calibration measurement operation counter for maintaining a count of the current number accepted calibration measurement operations.

Figure 8:
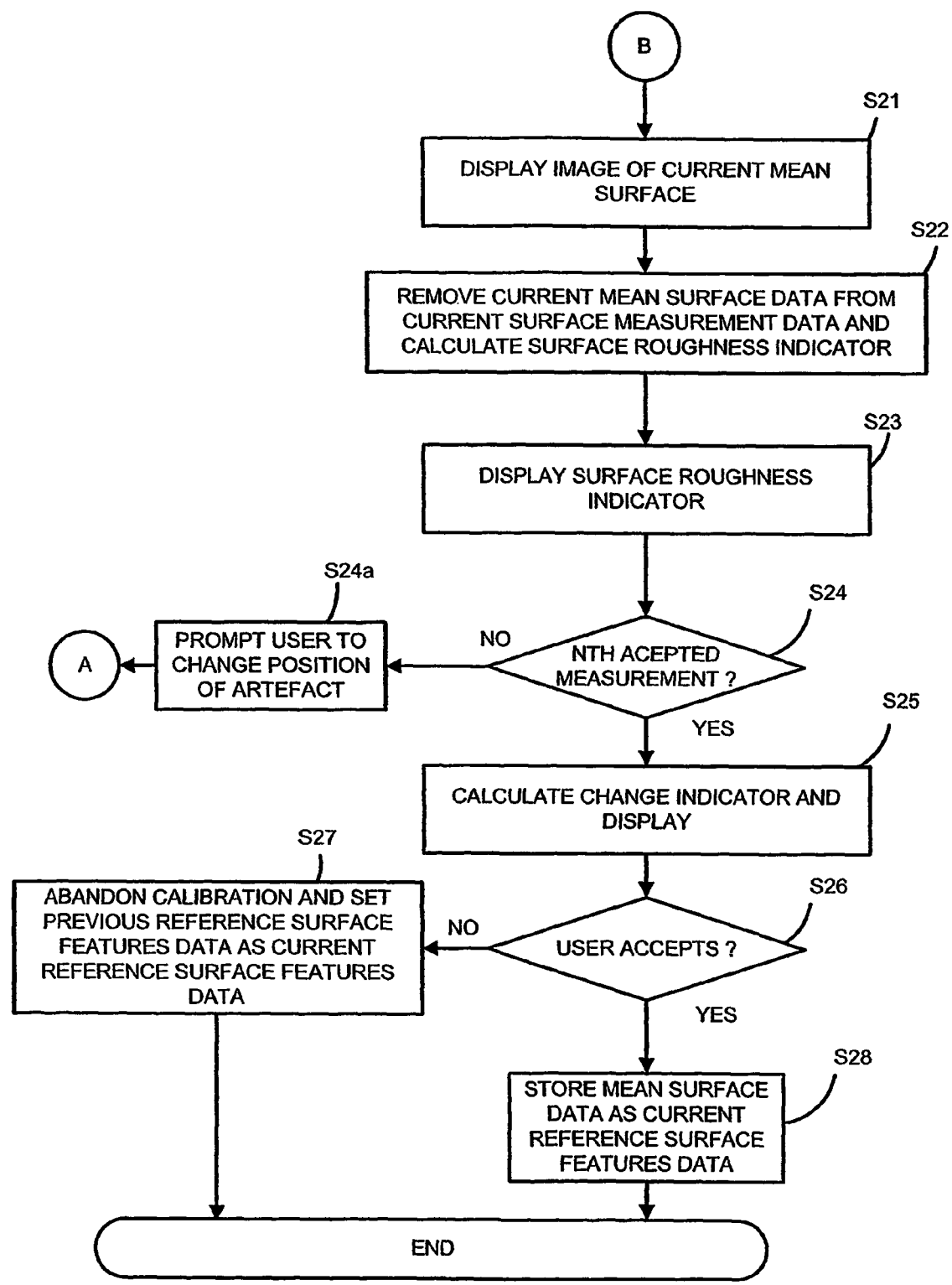

Once the mean surface data has been calculated, then, at S21 in FIG. 8, the reference calibrator controller 50 causes, via the user interface communicator 57, the mean surface data stored in the mean surface data store 59 to be displayed to the user on the user interface 70 with the image label 76a reading: "current mean surface".

Then, at S22 in FIG. 8, the reference calibrator controller 50 causes the surface roughness indicator calculator 55 to calculate a surface roughness indicator by, for each surface pixel, removing the current mean surface data stored in the mean surface data store 59 from the current processed surface topography data to produce surface difference data and then calculating either the root mean square (RMS) of the surface different data or determining a maximum peak to minimum peak value, St for the surface difference data. Alternatively, the surface roughness indicator calculator 55 may calculate the surface roughness indicator by determining the RMS of the current mean surface data.

Then, at S23, the reference calibrator controller 50 causes the surface roughness indicator calculated by the surface roughness indicator calculator 55 to be displayed in a roughness window 82 of the reference calibration window 77.

Then, at S24, the reference calibrator 50 checks whether the results of the predetermined number n of calibration measurement operations have been accepted by the user. If not, then, optionally, at S24a in FIG. 8, the reference calibrator controller 50 may cause, via the user interface communicator 57, the user interface to display a message prompting the user to re-position the artefact for the next calibration measurement operation in accordance with the artefact setup instructions.

When the reference calibration user interface prompts the user to re-position the artefact at S24a, then the user may move and/or rotate the artefact in accordance with the artefact set up instructions. This re-positioning of the artefact causes the averaging in S20 in FIG. 7 to remove the form of the artefact from the individual measurements.

The reference calibrator controller 50 then increments the measurements made number shown in window 79 by 1 and decrements the measurements to go number in window 80 and waits for the user to select the start measurement button 81 after re-positioning the artefact to instruct the next calibration measurement operation.

The reference calibrator then repeats steps S14 to S24 until the answer at step S24 is yes, that is until the user has accepted the predetermined number n of calibration measurement operations. At this stage, the image displayed in the image window at step S21 in FIG. 7 will represent the final mean surface data. FIG. 11c shows an example 93 of such an image illustrating that surface features of the artefact have been removed by the averaging procedure.

The reference calibration procedure so far described thus enables a user to inspect an image representing the processed surface topography data and to discard an image if it is unsatisfactory for some reason, for example if it shows signs of specks of dust or other dirt, so that only measurements that the user considers are satisfactory are used in the reference calibration procedure.

In addition, the reference calibrator user interface provides the user with an indication in roughness window 82 in FIG. 10 of surface roughness which should provide the user with an indication as to how well the calibration procedure is doing in removing surface features of the artefact because the surface roughness should reach a minimum when the surface features of the artefact have been removed so that the only remaining surface features are surface features of the reference mirror (that is features of surface form, surface roughness or texture, including any marks scratches or the like). The roughness indicator may also alert the user to any problems with the calibration procedure. Thus, for example, if the roughness indicator suddenly increases markedly, then the user will know that a problem has occurred with the calibration procedure and can immediately select a calibration reject button 87 of the reference calibration window 77 shown in FIG. 10 to abort the calibration procedure.

Assuming that the user has no reason to abort the calibration procedure then when, at step S24 in FIG. 8, the reference calibrator controller 50 determines that the user has accepted n measurements, then, at S25, the reference calibrator controller 50 causes the change indicator calculator 56 to calculate a change indicator that provides the user with drift information relating to changes in time in the surface features of the reference mirror 6 to give the user an indication as to how frequently it may be necessary to re-calibrate the reference.

In this example, the change indicator calculator 56 is arranged to calculate the difference between the current surface roughness indicator calculated by the surface roughness indicator 55 and the previous a change window 85 of the reference calibration window 77.

As another possibility, the change indicator calculator 56 may, as shown by the dotted lines in FIG. 6, access the mean surface data store 59 and the reference surface features data store 60 and calculate the difference between the mean surface data and previous stored reference surface features data, determine the root mean square of the difference and then display that value as an indication of change with time in the surface features of the reference mirror.

Once the change indicator has been calculated and displayed in the change window 85 at step S25 then, at step S26, the reference calibrator controller 50 waits for input from the user via the user interface communicator 57 indicating whether the user has selected a calibration accept button 86 of the reference calibration window 77 to accept the results of the calibration procedure or has selected the calibration reject button 87.

The user may use the change indicator displayed in the change window 85 and the roughness indicator displayed in the roughness window 82 to determine whether or not to accept the calibration. For example, if one or other of these values is very high then the user may consider that the calibration is suspect and may reject it. The user may use his own judgement to determine whether these indicators are within acceptable limits or may be provided with guidelines as to acceptable values in the artefact set up instructions.

If the user selects the accept button 86 then, at S28 in FIG. 8, the reference calibrator controller 50 causes the reference surface features data storer 60 to replace the previous reference surface features data in the reference surface features data store 61 with the mean surface data stored in the mean surface data store 59.

If, however, the user selects the reject button 87, then at step S27 in FIG. 8, the reference calibrator controller 50 causes the calibration to be abandoned and causes the reference surface features data storer 60 to access the previous reference surface features data from the previous reference surface features data store 62 and set it as the current reference surface features data in the reference surface features data store 61. The fact that the previous reference surface features data is not overwritten means that, if something does go wrong during the calibration procedure, the previous reference surface features data can be reinstated.

The above described calibration procedure may be repeated for each different type of lens of the objective lens assembly available with the surface profiling apparatus. Once the reference has been calibrated then the user may use the surface profiling apparatus to conduct measurements on actual samples.

Figure 12:
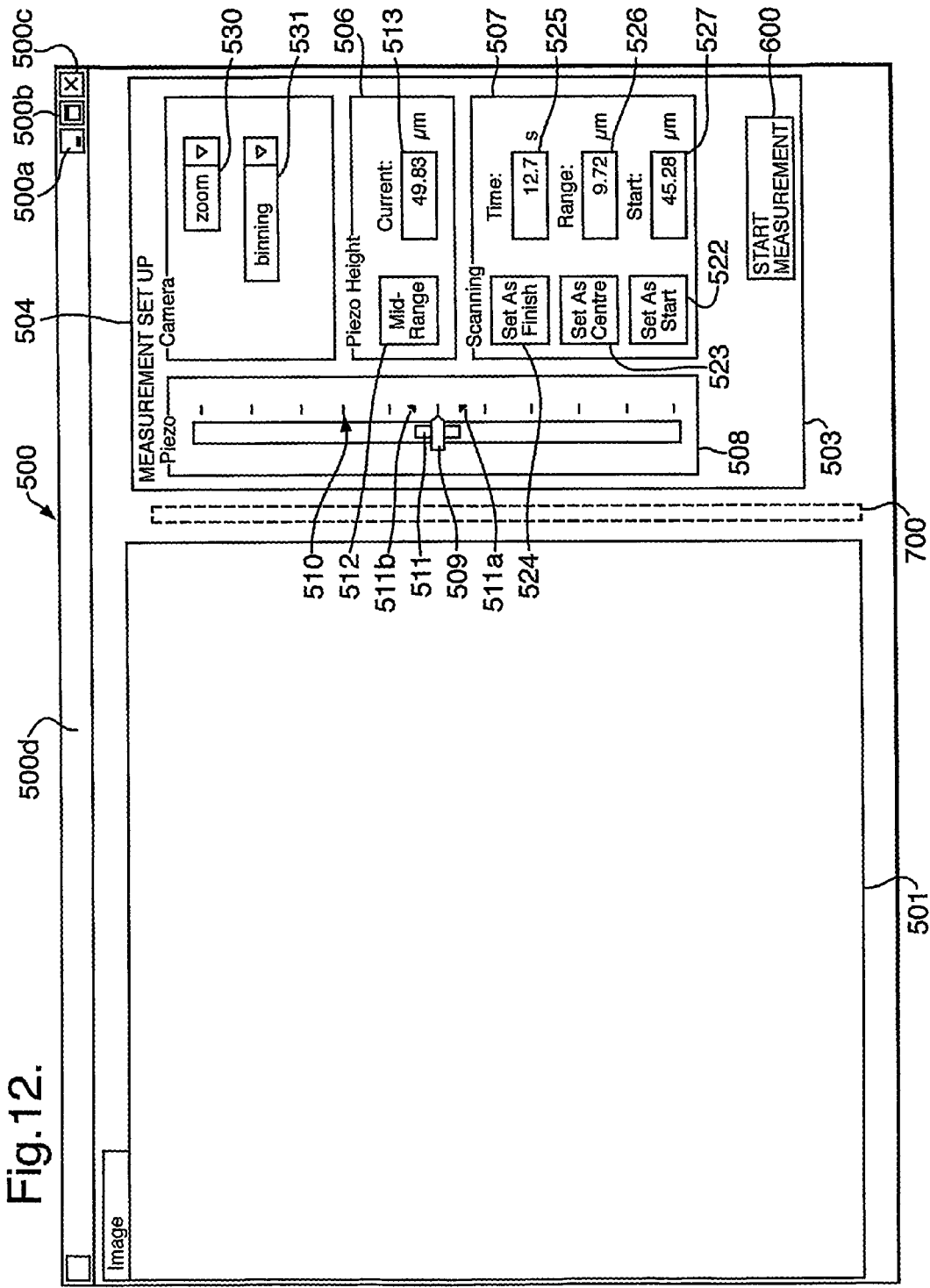
FIG. 12 shows an example of a user interface that may be displayed to a user to set up a measurement operation for an actual sample.
Figure 13:
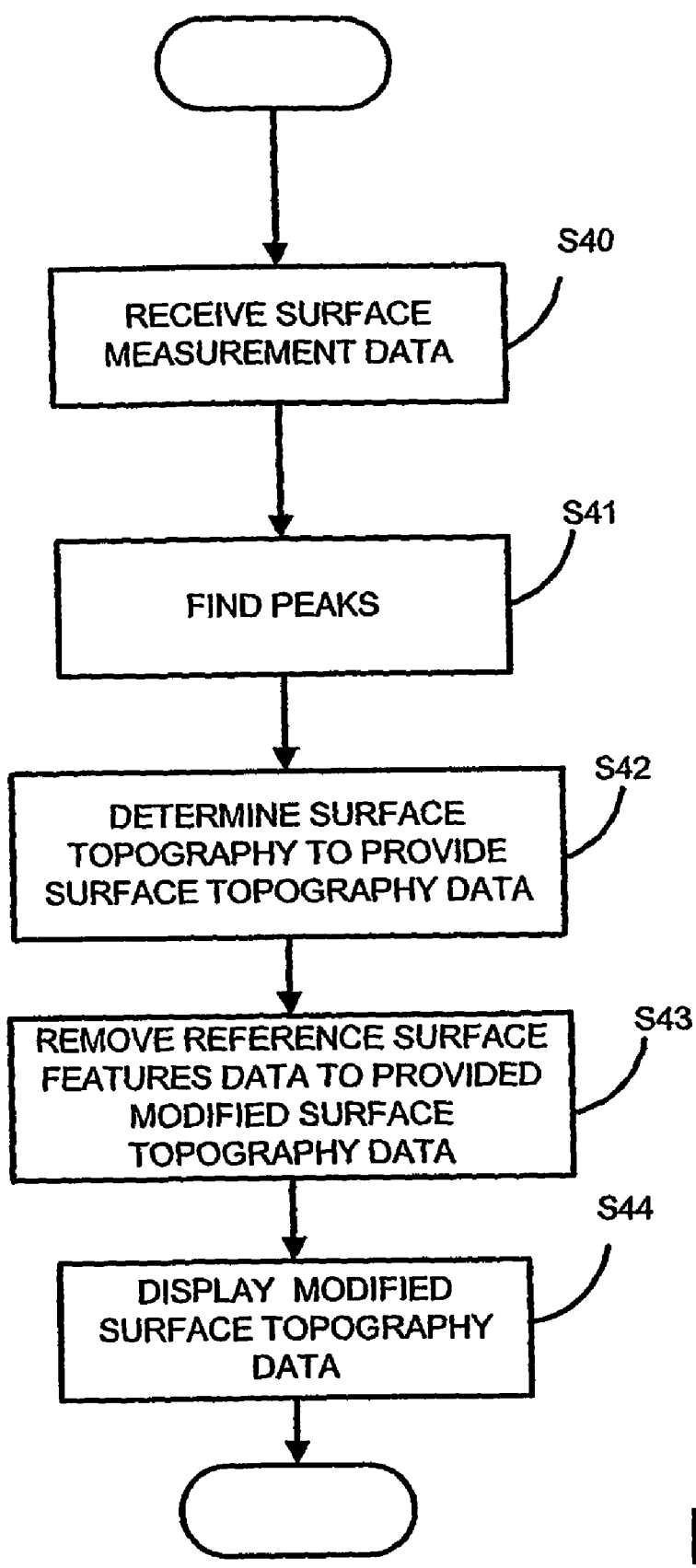
FIG. 13 shows a flowchart for illustrating operation of the surface profiling apparatus shown in FIG. 1 to determine the surface topography of a sample.

Operation of the surface profiling apparatus to conduct a measurement operation on an actual sample will now be described with the aid of FIGS. 12 and 13 in which FIG. 12 shows a measurement operation user interface screen 500 that the control apparatus 30 causes to be displayed to the user when the user selects to carry out a measurement operation and FIG. 13 shows a flowchart for illustrating operation of the surface profiling apparatus during a measurement operation.

As shown in FIG. 12, the measurement operation user interface screen 500 has a Windows style appearance with a minimise button 500a, a close button 500c, a title bar 500d and optionally a maximise button 500b.

The working area of the display screen 500 has a first tabbed window 501 having a tab title bar "image" 502 and a second tabbed window 503 having a tab title bar "measurement set up" 504.

The window 501 is configured to display an image or frame acquired by the 2D image sensor detector 10 while the window 503 is configured to provide a user with a number of tools or operational functions to aid the user in setting up of the scan path for a measurement operation.

The window 503 has a first border 505 labelled "camera" bounding user selectable functions relating to functions of the detector 10, a second border 506 labelled "piezo height" encompassing a user selectable option for selecting a height for the piezoelectric Z mover, a third border 507 labelled "scanning" encompassing user selectable scanning parameters and a fourth border 508 labelled "piezo" encompassing a piezo range scale 510, a pointer or slider bar 509 for indicating the current position of the Z mover 15, and a measurement range bar 511 indicating the range of Z movement set for a measurement operation, the measurement range bar 511 being associated with scan end markers 511a and 511b for indicating the ends of the measurement path. The slider bar or pointer 509 is movable by a user to enable the user to change the current location of the Z mover 15.

The piezo height border 506 encompasses a button 512 which, when selected by a user using the pointing device, causes the control apparatus 30 to move the Z mover 15 to the mid-point of its operational range and to move the slider bar or pointer 509 to the corresponding position on the scale 510 so that it still shows the current position of the Z mover 15, and a window 513 that displays, in micrometres (μm), the current position of the Z mover 15 relative to a nominal zero position, that is the position of the Z mover corresponding to the position set by the coarse Z positioner 20. The window 513 displays the actual current position of the Z mover 15 but is configured to enable a user to over type the current position using the keyboard to cause the control apparatus 30 to move the Z mover 15 to the new current position specified by the user as an alternative to moving the slider bar or pointer 509.

The scanning border 507 encompasses three buttons labelled "set as finish", "set as centre" and "set as start" 524, 523 and 522 that are configured to be used in combination with the slider bar or pointer 509 to enable a user to identify a selected position of the slider bar or pointer 509 to the control apparatus 30 as a finish, centre and start positions for a measurement operation. The scanning border 507 also encompasses three windows 525, 526 and 527 that are arranged to display a scan time (in seconds), and scan range and scan start position (both in micrometres). As in the case of the window 513, the scan range and scan start position windows are configured so that a user can over type the data to cause the controller to modify the range and start position, as the case may be, in accordance with the data input by the user using the keyboard.

The slider bar or pointer 509 and measurement range bar 511 and associated end markers 511a and 511b are configured to provide the user with a clear visual representation and control over the relationship between the measurement path range represented by the measurement range bar 511 and the start and end of the measurement path of the piezoelectric Z mover represented by the end markers 511a and 511b (the actual scan path of the Z mover 15 may include an initial run up portion and a final run down portion beyond the measurement path to enable frames of data to be acquired to enable data analysis over the entire length of the measurement path). The mid-range button 512 enables the user easily to cause the Z mover 15 to move to the middle part of its range of movement to ensure that the Z mover 15 is operating in mid-range and not at the extremes of its operational range.

The camera border 505 encompasses a zoom drop down menu 530 and a binning drop down menu 531 and 532 for enabling a user to select from available zoom and binning options.

In this example, the window 503 also includes a "start measurement" button 600 for enabling a user to instruct the apparatus to start a measurement operation once the user is satisfied with the measurement set up parameters. Once the user has instructed the apparatus to commence a measurement operation by selecting the start button 600, then as described above, the control apparatus controls the detector 10 and motion controller 11 to cause images to be captured at scan intervals along the scan paths. These captured images are stored in the frame buffer of the data receiver 33 and processed by the peak finder 34 and surface topography determiner 35 at steps S40, S41 and S42 in FIG. 13. These steps correspond to steps S30 to S32 in FIG. 9 except that, of course, in this case, the measurement operation is being conducted on an actual sample.

Then, at S43 in FIG. 13, the reference surface features remover 37 modifies the surface topography data to compensate for the surface features of the reference mirror by subtracting the reference surface features data stored in the reference surface features data store 61 from the surface topography data. Where the user has not selected binning of the image data then the subtraction is conducted on a one-to-pixel basis. Where, however, the user has selected binning, then the control apparatus 30 cases the reference surface features remover 37 to mimic the effect of binning by adding together adjacent reference surface features pixel data values to produce binned equivalent reference surface features data values. Thus, for example, if the user selects binning which combines or averages the output of four sensing elements SE (a two by two matrix of sensing elements), then the reference surface features remover 37 combines or averages a corresponding set of four (a two by two matrix) adjacent reference surface features data pixel values.

Once the reference surface features remover 37 has removed the surface features of the reference from the surface topography data then the control apparatus 30 causes the display 31b to display the modified surface topography data to the user in the window 501 as a two dimensional bit map image.

Removal of the surface features of the reference from the surface topography data enables the surface topography of the sample to be viewed more easily because it is not modified or distorted by those surface features of the reference mirror. In addition to removing form in the reference mirror from the measurement results, the calibration procedure also removes the effect on the measurement results of surface roughness features including marks and scratches that the reference mirror may have.

In addition to the bit map images described above (examples of which are shown in FIGS. 11a to 11c) the surface profiling apparatus may be configured to show graphical representations of the change in height or surface topography along particular or user selectable directions across the surface or may be configured to access software that enables such graphical representations to be produced. Removing the surface features of the reference mirror from the surface topography data enables such graphical representations to represent more accurately the surface profile of the selected cross-section.

In the embodiments described above, the reference calibrator provides the user with a user interface in which the reference calibration set up instructions and data input is provided by the reference calibration window 77. It will, of course, be appreciated that the set up instructions may be provided separately from the data entry windows. Also, the user interface 70 need not necessarily have the configuration shown in FIG. 10, for example, the data input windows and selection buttons may be organised differently on the screen. As other possibilities, for example, the measurements made and the measurements to go windows may be replaced with slide bars or level indicators that increase and decrease, respectively, with the number of measurements made. Similarly, it may be possible to provide a graphical rather than numeric representation representing the roughness and change indicators, in which case, the user interface may provide markers indicating the acceptable range for the represent change indicators.

Although FIGS. 10 and 12 show separate user interface display windows, it is possible that the reference calibration window and the measurement set up window may be respective different tabbed panes of the same user interface with the user interface being configured to display the one of the tabbed panes selected by the user. Such a user interface may also include further tabbed panes for enabling, for example, other calibration procedures to be conducted.

Figure 14:
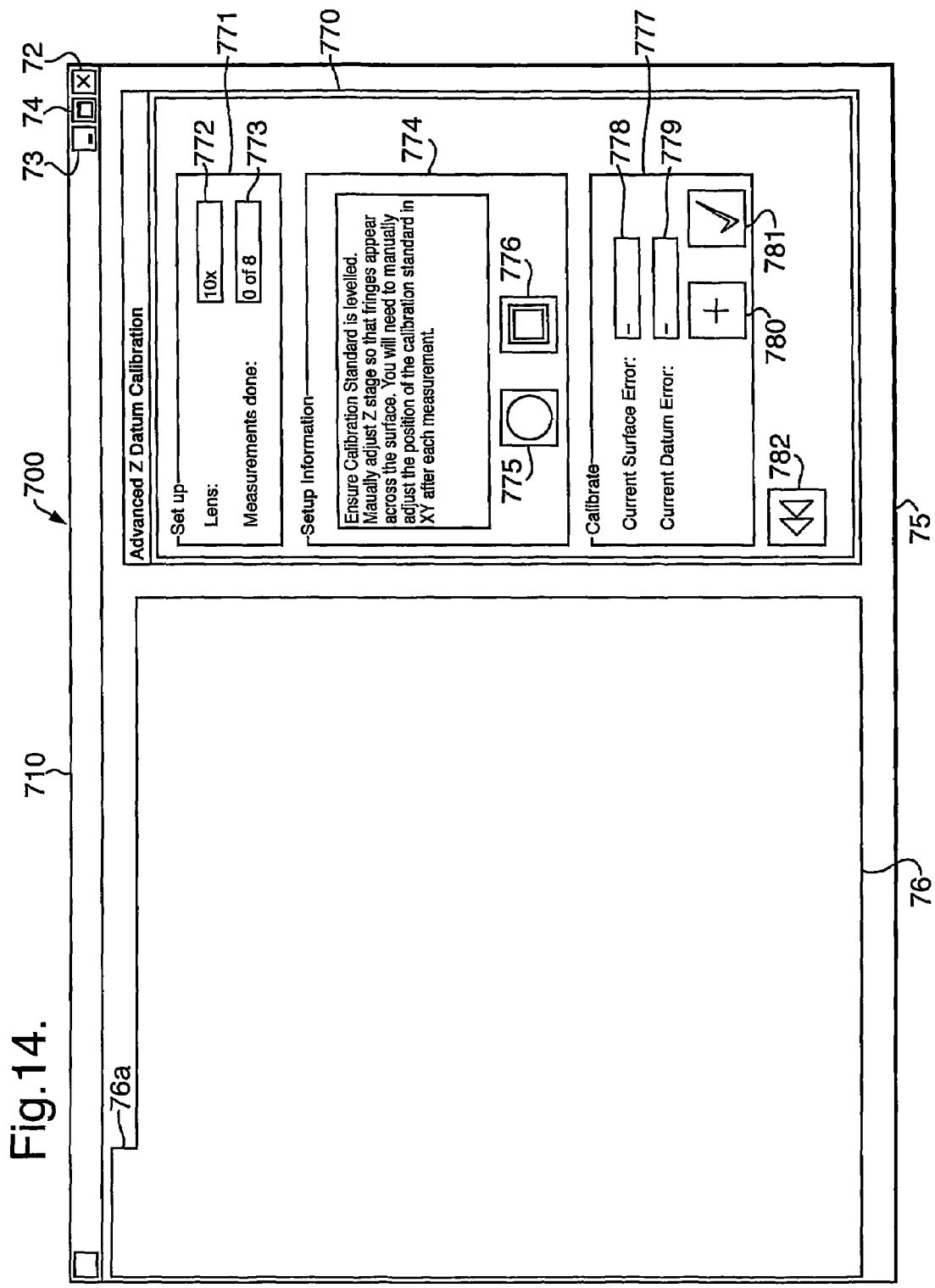
FIG. 14 shows, very schematically, an example of another reference calibration user interface that may be provided by the surface profiling apparatus to assist the user during the reference calibration procedure.

FIG. 14 shows, very schematically, an example of another reference calibration user interface screen 700 that may be provided by the surface profiling apparatus to assist the user during the reference calibration procedure instead of that shown in FIG. 10. The user interface screen 700 has, again, a Windows style appearance with a title bar 71 and the usual close and minimise buttons 72 and 73 (and optionally also a maximise button 74) in the top right hand corner. A working area 75 of the reference calibration user interface screen 70 displays an image window 76 within which images are displayed to the user and a reference calibration window 770.

The reference calibration window 770 differs from the reference calibration window 77 shown in FIG. 10 in that is has, a set up border 771 bordering a "lens" display window 772 that displays the lens type magnification that has previously been selected by the user and a single "measurement done" display window 773 that replaces the windows 79 and 80 in FIG. 10 by showing the number of measurements accepted out of the total required number of accepted measurements, as illustrated 0 out of a required total of 8 measurements have been accepted.

The reference calibration window 770 also has a set-up border 774 that bounds a window showing instructions for a user to set up a "Calibration Standard" or artefact. As an example, the instructions shown advise the user to: "Ensure Calibration Standard is levelled. Manually adjust Z stage so that fringes appear across the surface. You will need to manually adjust the position of the Calibration Standard in XY after each measurement.". The set-up border 774 also bounds a measurement "go" or start button 775 which in practice will normally be coloured green and a restart button 776 that enables a user to re-zero the mean surface data in the mean surface data store 59 to restart a calibration procedure.

The reference calibration window 770 also has a calibrate border 777 that bounds a "Current Surface Error" window 778 for displaying the surface roughness indicator and a "Current Datum Error" window 779 for displaying the change indicator. The calibrate border 777 also bounds a measurement accept button 780 labelled with a plus sign for enabling the user to accept a calibration measurement operation. The measurement accept button 780 replaces the accept and reject buttons 83 and 84 in FIG. 10. In this case, if the user does not click on or select the measurement accept button 780 button before again selecting the measurement start button 775, the results of the calibration measurement operation will be discarded. The calibrate border 777 also bounds a calibration accept button 781 labelled with a tick sign that is greyed out and unselectable until the required number of measurements have been accepted. The calibration accept button 781 781 replaces the accept and reject buttons 86 and 87 in FIG. 10. In this case, not clicking on or selecting the calibration accept button 781 before selecting or clicking on a double arrow labelled button 782 to return, for example, to the measurement screen shown in FIG. 12, will cause the results of the calibration to be discarded and the previous reference surfaces features data to be reinstated.

In the above described embodiments, the calibration procedure is effected for the entirety for the reference mirror. The user may, however, be provided with the option to enable calibration to be conducted over only a part of the reference mirror where the user knows that only that part of the reference mirror will be used during subsequent measurement operations.

In the embodiments described above, the calibration procedure is started from scratch. The calibration procedure could, however, also be commenced from a previously stored reference topography data or may be used to update or modify previously stored reference form data rather than to replace it.

The processing carried out on the artefact surface topography data at S16 in FIG. 7 may be modified. For example, the zero mean levelling procedure may be replaced by a levelling procedure that simply determines, by a least squares fitting procedure the average x and y gradients or tilt of the calibration artefact.

In the embodiments described above, the user interface is a graphical user interface. The user interface may, additionally, or alternatively, allow a user to input data and/or instructions in spoken form if the user interface includes a microphone and speech recognition software. Similarly, the user interface may be configured to provide the artefact set up instructions and other instructions to the user in a spoken or audible form if the user interface includes a loudspeaker and a text-to-speech converter.

As described above, the user has the option whether or not to accept both a calibration measurement operation and the final calibration. As other possibilities, the user may be provided with this option for only one of these or neither.

As described above, the surface topography data processor 53 processes the surface topography data by effecting, in order: levelling to compensate for surface tilt; thresholding to remove or modify excessive data values; where data for a surface pixel is missing, replacing or filling in the missing data with data obtained by interpolation from adjacent surface pixel data or a similar technique; and low pass filtering to remove high frequency components. One or more of these processes may be omitted. For example the levelling process may be omitted, particularly if the apparatus facilitates user levelling of samples on the support 9. Also, the low pass filtering may be omitted although it does have the advantages of removing white noise that may be present in the signal from the detector and reducing the effect of slight movments in the reference mirror due, for example, to thermal changes. Also, the thresholding may be omitted. The missing data process may be carried out, for example, only when the data is missing in both the current mean surface data and the current surface topography data.

In addition one or more of the functional components of the surface profiling apparatus may be located separately, for example, remotely from the others. For example, the data processor, the control apparatus, the user interface and the interferometer system may be provided separately and linked by communication links.

As described above, the surface profiling apparatus uses a z-axis datum. This may be replaced by a gantry or microscope-style support.

The invention claimed is:

1. Surface profiling apparatus for obtaining surface topography data for a surface of a sample, the apparatus comprising:
    a sample support to support the sample;
    a light director operable to direct light along a sample path towards the sample surface and along a reference path towards a reference surface such that light reflected by corresponding regions of the sample surface and the reference surface interfere;
    a mover operable to effect relative movement along a measurement path between the sample surface and the reference surface;
    a sensor operable to sense, for each of a number of regions of the sample surface, light representing the interference fringes produced by that sample surface region during said relative movement;
    a controller operable to carry out a measurement operation by causing said mover to effect said relative movement while said sensor senses light intensity at intervals to provide, for each of the number of regions, a set of intensity values representing interference fringes produced by that region during said relative movement;
    a data processor operable to process the sets of light intensity data to determine from the light intensity data values associated with each sensed region a position along the measurement path at which a predetermined feature occurs in the light intensity data for that sensed region; and
    a surface topography determiner operable to determine from the positions at which the predetermined feature occurs in the light intensity data for the different sensed regions the relative surface heights of the different sensed regions to provide surface topography data,
    the apparatus further comprising:
    a reference calibrator operable to calibrate the apparatus to compensate for surface features of the reference surface, the reference calibrator comprising:
        a user instructor operable to instruct a user to conduct a number of calibration measurement operations using a calibration sample having a calibration surface;
        a user-operable calibration measurement initiator operable to initiate a calibration measurement operation;
        a calibration controller operable to cause, in response to operation of the calibration measurement initiator, operation of the controller, data processor and surface topography determiner to carry out a calibration measurement operation to obtain calibration surface topography data for the calibration sample;
        a display controller operable to cause a display to display to the user an image representing the calibration surface topography data obtained in the calibration measurement operation;
        a user-operable measurement acceptor operable to enable a user either to accept or reject the calibration surface topography data represented by the displayed image;
        a mean surface calculator operable to calculate mean surface topography data using the accepted calibration surface topography data to provide reference surface features data when the user has accepted the calibration surface topography data for said number of calibration measurement operations; and
        a reference surface features compensator operable to adjust surface topography data obtained for a sample surface in accordance with the reference surface features data.

2. Apparatus according to claim 1, wherein the mean surface calculator is operable to calculate an amplitude-retaining mean each time the user accepts the calibration surface topography data for a calibration measurement operation.

3. Apparatus according to claim 2, wherein the mean surface calculator is operable to calculate the mean surface data by setting the mean surface data as the calibration surface topography data for a first accepted calibration measurement operation and then, for each successive accepted calibration measurement operation, adding a first predetermined proportion of that calibration surface topography data to a second predetermined proportion of the current mean surface data.

4. Apparatus according to claim 2, wherein the mean surface calculator is operable to calculate the mean surface data by setting the mean surface data as the calibration surface topography data for a first accepted calibration measurement operation and then, for each successive accepted calibration measurement operation, adding a first predetermined proportion of that calibration surface topography data to a second predetermined proportion of the current mean surface data, wherein the first predetermined proportion is $1/n$ and the second predetermined proportion is $(n-1)/n$.

5. Apparatus according to claim 2, wherein the mean surface calculator is operable to calculate the mean surface data by setting the mean surface data as the calibration surface topography data for a first accepted calibration measurement operation and then, for each successive accepted calibration measurement operation, adding a first predetermined proportion of that calibration surface topography data to a second predetermined proportion of the current mean surface data1 wherein the first predetermined proportion is 1/x and the second predetermined proportion is (x-1)/x where x is a count commencing at 2 for the second accepted calibration measurement operation and increasing by 1 with each subsequent accepted calibration measurement operation.

6. Apparatus according to claim 1, further comprising a surface roughness determiner operable to determine from the mean surface data and the surface topography data a surface roughness indicator and a surface roughness indicator provider operable to provide the surface roughness indicator to the user.

7. Apparatus according to claim 2, further comprising a surface roughness determiner operable to determine, each time a calibration measurement operation is carried out, a surface roughness indicator using the current mean surface data and surface topography data and a surface roughness indicator displayer operable to display the surface roughness indicator to the user.

8. Apparatus according to claim 6, wherein the surface roughness determiner is operable to determine the surface roughness indicator by using data derived by subtracting the mean surface data from the surface topography data.

9. Apparatus according to claim 6, wherein the surface roughness determiner is operable to determine the surface roughness indicator by determining the root mean square of mean surface data or by determining the root mean square of data obtained by subtracting the mean surface data from the surface topography data.

10. Apparatus according to claim 6, wherein the surface roughness determiner is operable to determine the surface roughness indicator by determining a peak to peak value of data obtained by subtracting the mean surface data from the surface topography data.

11. Apparatus according to claim 1, further comprising a reference change data determiner operable to determine a reference change indicator from data representing a change in the reference surface features data since a previous calibration and a reference change provider operable to provide the reference change indicator to the user.

12. Apparatus according to claim 1, further comprising a reference change data determiner operable to determine a reference change indicator using data representing a change in the reference surface features data since a previous calibration and a reference change indicator displayer operable to display the reference change indicator to the user.

13. Apparatus according to claim 11, wherein the reference change data determiner is operable to determine the reference change indicator by subtracting the current reference surface features data from the previous reference surface features data to obtain difference data and determining the root mean square of the difference data.

14. Apparatus according to claim 6, further comprising a reference change data determiner operable to determine a reference change indicator using data representing a change in the surface roughness indicator since a previous calibration and a reference change indicator displayer operable to display the reference change indicator to the user.

15. Apparatus according to claim 14, wherein the reference change data determiner is operable to determine the reference change indicator by subtracting the current surface roughness indicator from the previous surface roughness indicator.

16. Apparatus according to claim 1, wherein the reference calibration controller has a reference calibration user interface provider operable to cause a display to display a user interface which provides an image display window to display an image representing surface topography data, the user instructor, a user-selectable start element or button providing the user operable calibration measurement initiator and a user-selectable accept element or button providing the user-operable acceptor operable to enable a user either to accept or reject the calibration surface topography data represented by the displayed image.

17. Apparatus according to claim 6, wherein the reference calibrator has a reference calibration user interface provider operable to cause a display to display a user interface which provides an image display window to display an image representing surface topography data, the user instructor, a user-selectable start element or button providing the user operable calibration measurement initiator, a user-selectable accept element or button providing the user-operable acceptor to enable a user either to accept or reject the calibration surface topography data represented by the displayed image, and a display window to display the surface roughness indicator.

18. Apparatus according to claim 11, wherein the reference calibrator has a reference calibration user interface provider operable to cause a display to display a user interface which provides an image display window to display an image representing surface topography data, the user instructor, a user-selectable start element or button providing the user operable calibration measurement initiator, a user-selectable accept element or button providing the user-operable acceptor to enable a user either to accept or reject the calibration surface topography data represented by the displayed image, and a display window to display the reference change indicator.

19. Apparatus according to claim 14, wherein the reference calibrator has a reference calibration user interface provider operable to cause a display to display a user interface which provides an image display window to display an image representing surface topography data, the user instructor, a user-selectable start element or button providing the user operable calibration measurement initiator, a user-selectable accept element or button providing the user-operable acceptor to enable a user either to accept or reject the calibration surface topography data represented by the displayed image, and display windows to display the surface roughness and reference change indicators.

20. Apparatus according to claim 1, further comprising a mean surface topography data display controller operable to display an image representing the mean surface topography data.

21. Apparatus according to claim 1, further comprising a user-operable calibration acceptor operable to enable a user either to accept or reject the reference surface features data.

22. Apparatus according to claim 21, further comprising an accessor operable to access previous reference surface features data when the user rejects the calibration.

23. Apparatus according to claim 1, wherein the reference calibration controller is operable to cause the controller to control the sensor to sense the entirety of the reference surface during a calibration measurement operation.

24. Apparatus according to claim 1, wherein the sensor has a plurality of sensing elements and is operable, in at least one surface measurement mode, to combine or bin outputs from a number of sensing elements representing light sensed from a number of adjacent surface regions during a measurement operation on a sample surface to obtain surface topography data for surface areas each comprising said number of adjacent surface regions and wherein the reference surface features compensator is operable to combine the reference surface features data for the same number of adjacent surface regions before adjusting the surface topography data.

25. A method of calibrating surface profiling apparatus for obtaining surface topography data for a surface of a sample, the apparatus including:
   a sample support that supports the sample;
   a light director that directs light along a sample path towards the sample surface and along a reference path towards a reference surface such that light reflected by corresponding regions of the sample surface and the reference surface interfere;
   a mover that effects relative movement along a measurement path between the sample surface and the reference surface;
   a sensor that senses, for each of a number of regions of the sample surface, light representing the interference fringes produced by that sample surface region during said relative movement;
   a controller that carries out a measurement operation by causing said mover to effect said relative movement while said sensor senses light intensity at intervals to provide, for each of the number of regions, a set of intensity values representing interference fringes produced by that region during said relative movement;
   a data processor that processes the sets of light intensity data to determine from the light intensity data values associated with each sensed region a position along the measurement path at which a predetermined feature occurs in the light intensity data for that sensed region; and
   a surface topography determiner that determines from the positions at which the predetermined feature occurs in the light intensity data for the different sensed regions the relative surface heights of the different sensed regions to provide surface topography data,
   the method comprising the steps of:
      instructing a user to conduct a number of calibration measurement operations using a calibration sample having a calibration surface;
      causing, in response to operation of a user-operable calibration measurement initiator, operation of the controller, data processor and surface topography determiner to carry out a calibration measurement operation to obtain calibration surface topography data for the calibration sample;
      causing a display to display to the user an image representing the calibration surface topography data obtained in the calibration measurement operation;
      calculating mean surface topography data using the accepted calibration surface topography data to provide reference surface features data when the user has accepted, using a user-operable measurement acceptor, the calibration surface topography data for said number of calibration measurement operations; and
      storing the mean surface topography data as reference surface features data.

26. A method according to claim 25, wherein the mean surface calculating step calculates an amplitude-retaining mean each time the user accepts the calibration surface topography data for a calibration measurement operation.

27. A method according to claim 26, wherein the mean surface calculating step calculates the mean surface data by setting the mean surface data as the calibration surface topography data for a first accepted calibration measurement operation and then, for each successive accepted calibration measurement operation, adding a first predetermined proportion of that calibration surface topography data to a second predetermined proportion of the current mean surface data.

28. A method according to claim 26, wherein the mean surface calculating step calculates the mean surface data by setting the mean surface data as the calibration surface topography data for a first accepted calibration measurement operation and then, for each successive accepted calibration measurement operation, adding a first predetermined proportion of that calibration surface topography data to a second predetermined proportion of the current mean surface data, wherein the first predetermined proportion is 1/n and the second predetermined proportion is (n−1)/n.

29. A method according to claim 26, wherein the mean surface calculating step calculates the mean surface data by setting the mean surface data as the calibration surface topography data for a first accepted calibration measurement operation and then, for each successive accepted calibration measurement operation, adding a first predetermined proportion of that calibration surface topography data to a second predetermined proportion of the current mean surface data, wherein the first predetermined proportion is 1/x and the second predetermined proportion is (x−1)/x where x is a count commencing at 2 for the second accepted calibration measurement operation and increasing by 1 with each subsequent accepted calibration measurement operation.

30. A method according to claim 25, further comprising the steps of determining from the mean surface data and the surface topography data a surface roughness indicator and displaying the surface roughness indicator to the user.

31. A computer readable medium adapted to instruct a processor to carry out a method for calibrating a surface profilinci apparatus, the method comprising the steps of:
   instructing a user to conduct a number of calibration measurement operations using a calibration samnie having a calibration surface;
   causing, in response to operation of a user-operable calibration measurement initiator, operation of a controller, a data processor and a surface topography determiner of the surface profiling apparatus to carry out a calibration measurement operation to obtain calibration surface topography data for the calibration sample;
   causing a display to display to the user an image representing the calibration surface topography data obtained in the calibration measurement operation;
   calculating mean surface topography data using the accented calibration surface topography data to provide reference surface features data when the user has accepted, using a user-operable measurement acceptor, the calibration surface topography data for said number of calibration measurement operations; and
   storing the mean surface topography data as reference surface features data.

32. Surface profiling apparatus for obtaining surface topography data for a surface of a sample, the apparatus comprising:
   sample support means for supporting the sample;
   light directing means for directing light along a sample path towards the sample surface and along a reference path towards a reference surface such that light reflected by corresponding regions of the sample surface and the reference surface interfere;
   moving means for effecting relative movement along a measurement path between the sample surface and the reference surface;

sensing means for sensing, for each of a number of regions of the sample surface, light representing the interference fringes produced by that sample surface region during said relative movement;

control means for carrying out a measurement operation by causing said moving means to effect said relative movement while said sensing means senses light intensity at intervals to provide, for each of the number of regions, a set of intensity values representing interference fringes produced by that region during said relative movement;

data processing means for processing the sets of light intensity data to determine from the light intensity data values associated with each sensed region a position along the measurement path at which a predetermined feature occurs in the light intensity data for that sensed region; and surface topography determining means for determining from the positions at which the predetermined feature occurs in the light intensity data for the different sensed regions the relative surface heights of the different sensed regions to provide surface topography data, the apparatus further comprising:

reference calibration means for calibrating the apparatus to compensate for surface features of the reference surface, the reference calibration means comprising:

user instruction means for instructing a user to conduct a number of calibration measurement operations using a calibration sample having a calibration surface;

user operable calibration measurement initiation means for initiating a calibration measurement operation;

calibration control means for causing, in response to operation of the calibration measurement initiation means, operation of the control means, data processing means and surface topography determining means to carry out a calibration measurement operation to obtain calibration surface topography data for the calibration sample;

display control means for causing a display to display to the user an image representing the calibration surface topography data obtained in the calibration measurement operation;

user-operable measurement acceptance means for enabling a user either to accept or reject the calibration surface topography data represented by the displayed image;

mean surface calculating means for calculating mean surface topography data using the accepted calibration surface topography data to provide reference surface features data when the user has accepted the calibration surface topography data for said number of calibration measurement operations; and reference surface features compensating means for adjusting surface topography data obtained for a sample surface in accordance with the reference surface features data.

33. Surface profiling apparatus for obtaining surface topography data for a surface of a sample, the apparatus comprising:

a sample support to support the sample;

a light director to direct light along a sample path towards the sample surface and along a reference path towards a reference surface such that light reflected by corresponding regions of the sample surface and the reference surface interfere;

a mover to effect relative movement along a measurement path between the sample surface and the reference surface;

a sensor to sense, for each of a number of regions of the sample surface, light representing the interference fringes produced by that sample surface region during said relative movement;

a controller to carry out a measurement operation by causing said mover to effect said relative movement while said sensor senses light intensity at intervals to provide, for each of the number of regions, a set of intensity values representing interference fringes produced by that region during said relative movement;

a data processor to process the sets of light intensity data to determine from the light intensity data values associated with each sensed region a position along the measurement path at which a predetermined feature occurs in the light intensity data for that sensed region; and a surface topography determiner to determine from the positions at which the predetermined feature occurs in the light intensity data for the different sensed regions the relative surface heights of the different sensed regions to provide surface topography data, the apparatus further comprising:

a reference calibrator to calibrate the apparatus to compensate for surface features of the reference surface, the reference calibrator comprising:

a user operable calibration measurement initiator to initiate a calibration;

a calibration controller to cause, in response to operation of the calibration measurement initiator, operation of the controller, data processor and surface topography determiner to carry out a number of calibration measurement operations to obtain in each calibration measurement operation calibration surface topography data for the calibration sample;

a surface topography data processor to process the calibration surface topography data obtained in the calibration measurement operations;

a mean surface calculator to calculate mean surface topography data using the processed calibration surface topography data to obtain reference surface features data to enable the reference surface features to be taken into account for surface topography data obtained in a subsequent measurement operation;

a surface roughness determiner to determine from the mean surface data and the surface topography data a surface roughness indicator; and a surface roughness indicator provider to provide the surface roughness indicator to the user.

34. Surface profiling apparatus for obtaining surface topography data for a surface of a sample, the apparatus comprising:

a sample support to support the sample;

a light director to direct light along a sample path towards the sample surface and along a reference path towards a reference surface such that light reflected by corresponding regions of the sample surface and the reference surface interfere;

a mover to effect relative movement along a measurement path between the sample surface and the reference surface;

a sensor to sense, for each of a number of regions of the sample surface, light representing the interference fringes produced by that sample surface region during said relative movement;

a controller to carry out a measurement operation by causing said mover to effect said relative movement while said sensor senses light intensity at intervals to provide, for each of the number of regions, a set of intensity values representing interference fringes produced by that region during said relative movement;

a data processor to process the sets of light intensity data to determine from the light intensity data values associated with each sensed region a position along the measurement path at which a predetermined feature occurs in the light intensity data for that sensed region; and a surface topography determiner to determine from the positions at which the predetermined feature occurs in the light intensity data for the different sensed regions the relative surface heights of the different sensed regions to provide surface topography data, the apparatus further comprising:

a reference calibrator to calibrate the apparatus to compensate for surface features of the reference surface, the reference calibrator comprising:

a user operable calibration measurement initiator to initiate a calibration;

a calibration controller to cause, in response to operation of the calibration measurement initiator, operation of the controller, data processor and surface topography determiner to carry out a number of calibration measurement operations to obtain in each calibration measurement operation calibration surface topography data for the calibration sample;

a surface topography data processor to process the calibration surface topography data obtained in the calibration measurement operations;

a mean surface calculator to calculate mean surface topography data using the processed calibration surface topography data to obtain reference surface features data to enable the reference surface features to be taken into account for surface topography data obtained in a subsequent measurement operation;

a reference change data determiner operable to determine a reference change indicator from data representing a change in the reference surface features data since a previous calibration; and a reference change provider operable to provide the reference change indicator to the user.

35. Surface profiling apparatus for obtaining surface topography data for a surface of a sample, the apparatus comprising:

a sample support to support the sample;

a light director to direct light along a sample path towards the sample surface and along a reference path towards a reference surface such that light reflected by corresponding regions of the sample surface and the reference surface interfere;

a mover to effect relative movement along a measurement path between the sample surface and the reference surface;

a sensor to sense, for each of a number of regions of the sample surface, light representing the interference fringes produced by that sample surface region during said relative movement;

a controller to carry out a measurement operation by causing said mover to effect said relative movement while said sensor senses light intensity at intervals to provide, for each of the number of regions, a set of intensity values representing interference fringes produced by that region during said relative movement;

a data processor to process the sets of light intensity data to determine from the light intensity data values associated with each sensed region a position along the measurement path at which a predetermined feature occurs in the light intensity data for that sensed region; and a surface topography determiner to determine from the positions at which the predetermined feature occurs in the light intensity data for the different sensed regions the relative surface heights of the different sensed regions to provide surface topography data, the apparatus further comprising:

a reference calibrator to calibrate the apparatus to compensate for surface features of the reference surface, the reference calibrator comprising:

a user operable calibration measurement initiator to initiate a calibration;

a calibration controller to cause, in response to operation of the calibration measurement initiator, operation of the controller, data processor and surface topography determiner to carry out a number of calibration measurement operations to obtain in each calibration measurement operation calibration surface topography data for the calibration sample;

a surface topography data processor to process the calibration surface topography data obtained in the calibration measurement operations;

a mean surface calculator to calculate mean surface topography data using the processed calibration surface topography data to obtain reference surface features data to enable the reference surface features to be taken into account for surface topography data obtained in a subsequent measurement operation, wherein the sensor has a plurality of sensing elements and is operable, in at least one surface measurement mode, to combine or bin outputs from a number of sensing elements representing light sensed from a number of adjacent surface regions during a measurement operation on a sample surface to obtain surface topography data for surface areas each comprising said number of adjacent surface regions and wherein the reference surface features compensator is operable to combine the reference surface features data for the same number of adjacent surface regions before adjusting the surface topography data.

* * * * *